(12) United States Patent
Juhala et al.

(10) Patent No.: US 11,611,373 B2
(45) Date of Patent: Mar. 21, 2023

(54) ELECTRONIC DEVICE AND DATA-TRANSMISSION SYSTEM

(71) Applicant: LOGMORE OY, Jyväskylä (FI)

(72) Inventors: Janne Juhala, Jyväskylä (FI); Antti Tapio, Keuruu (FI)

(73) Assignee: LOGMORE OY, Jyvaskyla (FI)

( * ) Notice: Subject to any disclaimer, the term of this patent is extended or adjusted under 35 U.S.C. 154(b) by 0 days.

(21) Appl. No.: 17/055,651

(22) PCT Filed: May 15, 2019

(86) PCT No.: PCT/FI2019/050383
§ 371 (c)(1),
(2) Date: Nov. 16, 2020

(87) PCT Pub. No.: WO2019/220015
PCT Pub. Date: Nov. 21, 2019

(65) Prior Publication Data
US 2021/0273680 A1    Sep. 2, 2021

(30) Foreign Application Priority Data
May 15, 2018   (FI) ..................... 20185446

(51) Int. Cl.
*H04B 5/00* (2006.01)
*G06K 19/06* (2006.01)
(Continued)

(52) U.S. Cl.
CPC ..... *H04B 5/0031* (2013.01); *G06K 19/06037* (2013.01); *G06K 19/06046* (2013.01);
(Continued)

(58) Field of Classification Search
CPC ................ H04B 5/0031; H04B 5/0037; G06K 19/06037; G06K 19/06046; G08C 17/02;
(Continued)

(56) References Cited

U.S. PATENT DOCUMENTS

2007/0241194 A1   10/2007   Lin et al.
2010/0078482 A1    4/2010   Bradford
(Continued)

FOREIGN PATENT DOCUMENTS

JP     2012113365 A    6/2012
JP     2016184281 A   10/2016
(Continued)

OTHER PUBLICATIONS

International Search Report in related International Application No. PCT/FI2019/050383, datd Sep. 26, 2019, 4 pages.
(Continued)

*Primary Examiner* — Eugene Yun
(74) *Attorney, Agent, or Firm* — FisherBroyles, LLP; Robert Kinberg

(57) ABSTRACT

The invention concerns an electronic device, which includes a memory for storing data, a processor for processing data, and an output device for showing machine-readable code containing the data for reading using a reader device. The electronic device includes a data-transmission interface for arranging a data-transmission link with one or more external devices, to which the electronic device is to be arranged to act as a user interface. The invention also relates to a data-transmission system including the electronic device and a server.

8 Claims, 17 Drawing Sheets

(51) Int. Cl.
*G08C 17/02* (2006.01)
*G08C 17/06* (2006.01)

(52) U.S. Cl.
CPC ............ *G08C 17/02* (2013.01); *G08C 17/06* (2013.01); *H04B 5/0037* (2013.01)

(58) Field of Classification Search
CPC ........ G08C 17/06; G08C 17/00; G08C 17/04; G08C 23/04
USPC ...................................................... 455/41.1
See application file for complete search history.

(56) References Cited

U.S. PATENT DOCUMENTS

| | | |
|---|---|---|
| 2014/0084067 A1 | 3/2014 | Vanderhulst |
| 2017/0270249 A1 | 9/2017 | Beetling et al. |
| 2017/0343990 A1 | 11/2017 | Baumann et al. |

FOREIGN PATENT DOCUMENTS

| | | |
|---|---|---|
| WO | 2013046231 A1 | 4/2013 |
| WO | 2013118088 A1 | 8/2013 |

OTHER PUBLICATIONS

Supplementary European Search Report in corresponding European Application No. 19804310, date of completion of the search, dated Jan. 11, 2022, 2 pages.

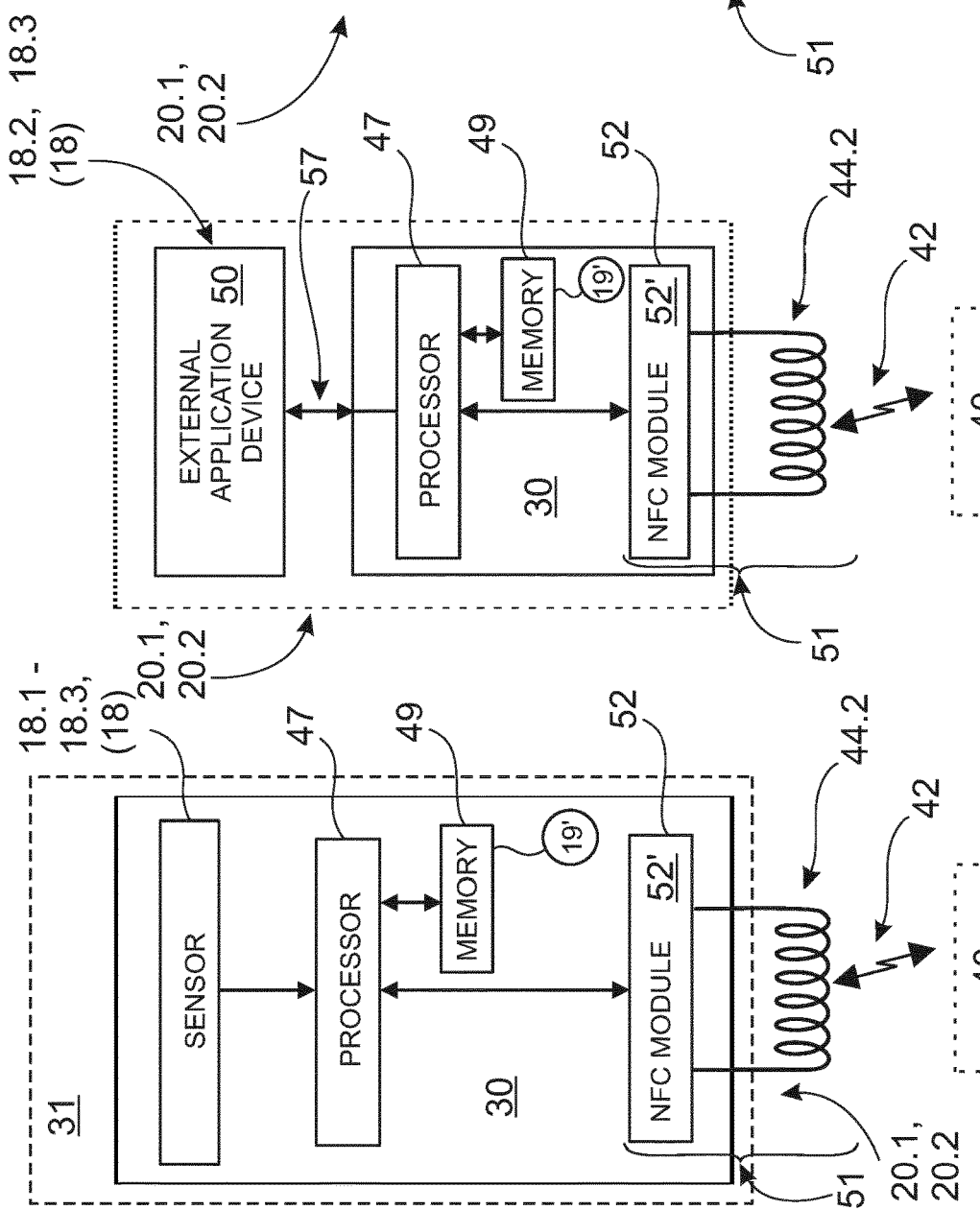

ELECTRONIC DEVICE AND DATA-TRANSMISSION SYSTEM

CROSS-REFERENCE TO RELATED APPLICATIONS

This application is a U.S. National Stage of International Patent Application No: PCT/FI2019/050383 filed on May 15, 2019, which claims benefit of Finland Patent Application No. FI 20185446 filed on May 15, 2018.

TECHNICAL FIELD

The invention concerns an electronic device.
In addition, the invention also concerns a data-transmission system.

BACKGROUND OF THE INVENTION

A monitoring solution utilizing dynamic QR code, more generally dynamic code, is known from international patent-application publication WO 2013/046231 A1. In it, when the state of the object being monitored changes, the QR code is also updated to correspond to the state. In other words, the state data of the object can be contained in the QR code contained in the URL address of the server. The QR code can be read, for example, using the camera of a mobile device and a QR-code reader application, in an as such known manner. On the basis of the reading, a service request is sent to the server identified by the QR code and the object's state data, measurement data, contained in the QR code is also transmitted there using the same service request.

In addition, a second solution of the type referred to above is also known from US patent-application publication US 2017/0270249 A1. This discloses the transportation of data embedded in a URL address, with the aid of dynamic QR code, to be utilized in medical devices.

The aforementioned measurement solutions, in which QR code is also utilized, are very manufacturer-specific. This limits and even rigidizes the application possibilities relating to them. The design and implementation, from the very start, of a measurement system equipped with QR code involves a comparatively great expense. The threshold to the implementation of such, especially in the case of a very limited and/or simple application, then becomes insuperable. In other words, the scalability of the implementation is then poor.

On the other hand, the known solutions also leave much to be desired in the controllability of many devices. The implementation of their user interfaces can also create its own comparatively large investment. As a result, the user interfaces become very simplified. On the other hand, there can nevertheless be numerous settings in the devices, which it would be possible to change. Changing settings through a simplified user interface in order to control diverse functions of the device can become a very complex procedure and thus demand that the user learns a great deal. The potential for errors also increases if an attempt is made to change the device's numerous settings through a very simplified user interface.

SUMMARY OF THE INVENTION

The present invention is intended to create an electronic device and system with improved scalability. According to one embodiment of the invention, there is provided an electronic device, comprising a memory to store data from at least one external device; a processor coupled to the memory to process the data; an output device to show machine-readable code containing the data for reading using a reader device; a data-transmission interface to arrange a two-way data-transmission link with the at least one external device, wherein the electronic device constitutes a user interface for the at least one external device; and a receiver to detect content fed by the reader device for arranging a two-way data transmission from the reader device to the at least one external device; wherein the processor is arranged to decode from the content at least one of settings and data intended for the at least one external device.

According to another embodiment of the invention, there is provided a data-transmission system, comprising: at least one electronic device arrangeable in connection with, respectively, at least one object arrangeable in the system, each electronic device comprising: a memory arranged to store data from at least one external device associated with the at least one object; a processor coupled to the memory to process the data; an output device for displaying machine-readable code containing at least one of the data and data formed from the data from the at least one external device to be read using a reader device with data transmitter; and a data-transmission interface comprising a receiver for arranging a two-way data-transmission link with the at least one external device, wherein the electronic device constitutes a user interface for the at least one external device; and a server arrangement arranged for data transmission with the reader device; wherein the at least one external device, respectively, belongs to the at least one object or is arranged in the at least one object; and wherein two-way data-transmission is arranged through the at least one external device from the server to the object and takes place through the reader device and the electronic device.

Owing to the invention, it becomes possible, for example, to build around an electronic device an ecosystem for different sensor manufacturers. An electronic device, which is equipped with an output device for machine-readable code, can in the invention then be used as a user interface to an external device. In other words, data transmission with an external device and/or an object connected to it, can be performed through the electronic device.

Owing to the invention, it becomes also possible to offer a data transmission service for external devices that are, for example, less demanding in their basic properties and/or user interfaces. The control/functions of an external device can then be diversified using a simple data-transmission interface made possible by the electronic device. In addition, owing to the invention it is possible to offer even a two-way data-transmission link to an external device. The functions and properties relating to that then become even more diverse than before, because owing to it the transmission of data, for example from the server system to an external device and/or object also becomes possible. Thanks to this property, data collected from an external device can, for example, be retrieved from a cloud-service's interface. In addition, for example, it becomes possible to program a new setting inside an external device from any web window at all, and even more generally, to transfer data. Other characteristic features and advantages of the invention may be appreciated from the following detailed description considered in conjunction with the accompanying drawings.

BRIEF DESCRIPTION OF THE DRAWINGS

In the following, the invention, which is not restricted to the embodiments described in the following, is described with reference to the accompanying figures, in which FIGS. 3a-3c show simplified diagrams of some examples of external devices to be located in an object, schematically as block diagrams.

DETAILED DESCRIPTION OF THE INVENTION

Figure 1:
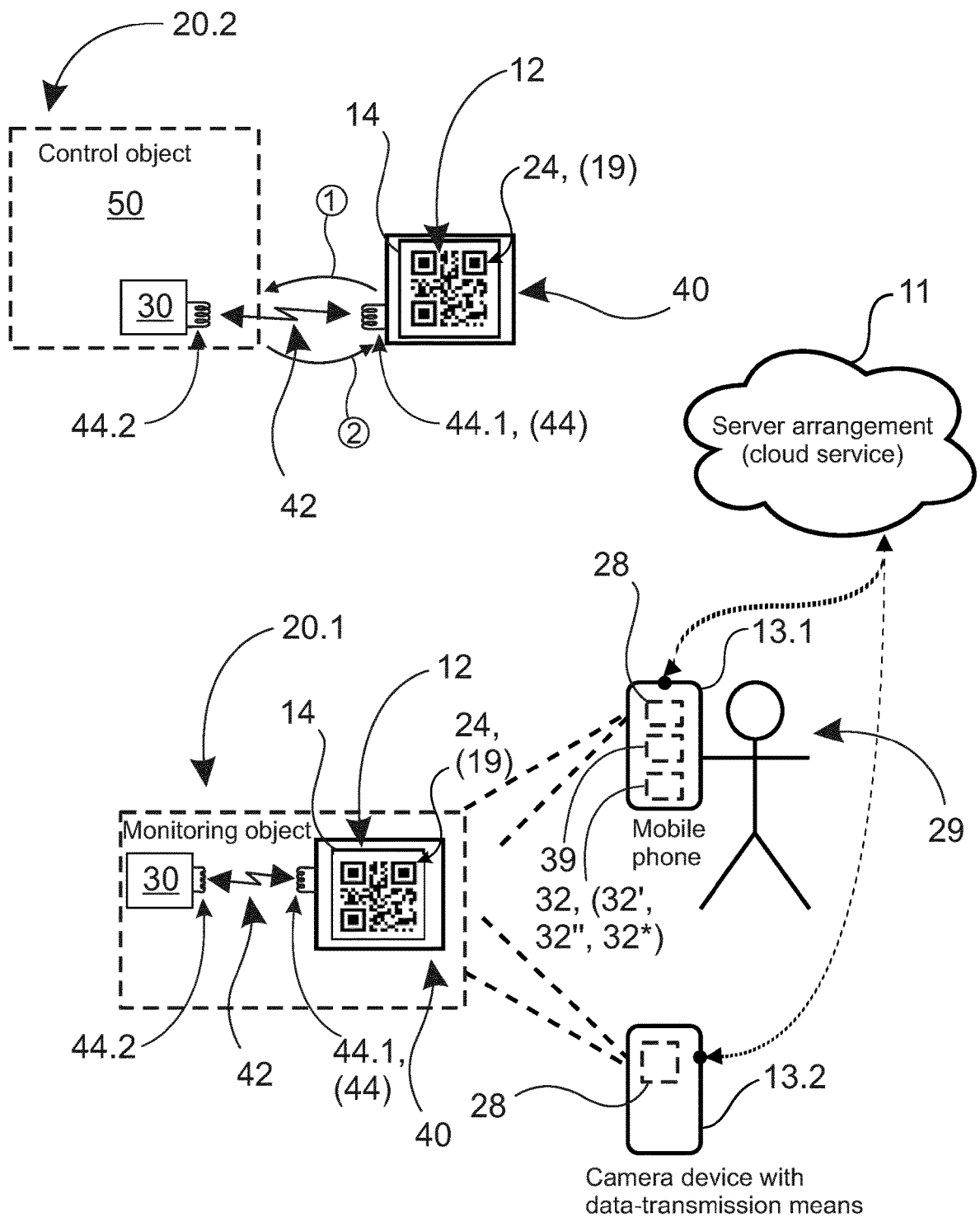
FIG. 1 shows a simplified schematic diagram of one example of the data-transmission system, for example, for monitoring and/or controlling objects.

FIG. 1 shows a simplified schematic diagram of an example of the data-transmission system 10. The basic components of the system 10 include a server arrangement 11 and one or more electronic devices 40 arranged or to be arranged in one or more objects 20.1, 20.2.

The objects can be an object 20.1 to be monitored and/or an object 20.2 to be controlled. The objects 20.1, 20.2 can be stationary or moving. In this context, the object 20.1 to be monitored can refer to, for example, an object from which one or more variables are measured. Owing to the measurement the monitoring of the object 20.1 is thus performed. One individual example of a stationary monitored object 20.1 is a building, in which, for example, moisture and/or temperature is measured and stored. An individual example of a moving monitored object 20.2 is refrigerated transport and the transport units involved. In it, the temperature of the transport and even the individual product packages involved can be measured and stored through the entire cold chain.

Controllable objects 20.2 are in turn characterized by having settings, which can be changed. Changing the settings can take place, for example, when starting up the object 20.2 and/or also during its life cycle. In addition, a monitored object 20.1 can also be controllable. In this, for example, the operation of the object, or even only the measurement settings relating to its monitoring can be changed. Thus, the applications made possible by the invention can be very diverse. Thus, the data-transmission system 10 can be said to be, for example, for monitoring and/or controlling the object 20.1, 20.2. More generally, however, one can speak of the data transmission between the object 20.1, 20.2 and the server arrangement 11, which the monitoring and even control of the object 20.1, 20.2 represent.

FIG. 1 shows the electronic device 40 in greater detail only in respect to the output device 14. The output device 14 is intended to present machine-readable code 12 containing data 19 to be read using the reader device 13.1, 13.2. In other words, the output device 14 is arranged to act as a data output means 19 to offer it from the electronic device 40 to the reader device 13.1, 13.2 for reading. Instead of code, one can also speak of a machine-readable graphic identifier. In the code 12 is to be arranged, in an encoded form, for example, data relating to the object 20.1, 20.2, which is available to the electronic device 40 in a manner to be described slightly later. In addition, the code 12 can also contain information as to where the data 19 encoded in the code 12 is to be sent after reading. In other words, for example, the internet address 67 (FIG. 4a) of the server arrangement 11.

The output device 14 is a readable device, a display, on which, for example, readable code 12, which is preferably visible optical code 24, can be displayed. One example of the code 12 can be QR (Quick Response) code 24. The code 12 can have the property of being quickly decoded and read. In addition, the code 12 is preferably processed by as such known consumer models of reader devices, without its reading requiring a special device arranged and tailored to read the code 12 in question. The code 12 can be mainly continuously visible of the output device 14. On the other hand, it can also be made visible on the output device 14 on the basis of a set criterion. Some examples of these are an excitation according to a set criterion addressed to the electronic device 40, position data of the electronic device 40 according to a set criterion, and/or still some other, for example, time-based criterion, which can be, for example, able to be set by the user/maintainer of the system 10.

The excitation for showing the code 12 can be, for example, the pressing of a button in the output device 14, or a signal detected by the output device 14 and identified as an excitation, such as, for example, a light or sound signal. The excitation can be given by, for example, the reader device 13.1, 13.2. The excitation can be generated, for example, by the server arrangement 11. The excitation can then be transmitted to the output device 14, for example, through the reader device 13.1, 13.2. One can speak more generally also of the remote control of the output device 14, more generally of the electronic device 40, and/or of an external device 30 connected to transmit data in a manner described in greater detail slightly later in the application, through the reader device 13.1, 13.2 by the server arrangement 11.

The output device 14, 14' can be of a type for which different states exist in the case of its power consumption. As one of these states, the output device 14, 14' can be a passive state in power consumption (for example, "sleep mode"). In the passive state, the output device 14, 14' is arranged to be zero-current, i.e. it does not then essentially consume power. In addition, the output device 14, 14' is arranged, or more generally can be arranged to show in the zero-current passive state the code 12 to be read by the reader device 13.1, 13.2. The output device 14, 14' can then be said to consume power only when the code 12 is being updated. The output device 14, 14' can then also be said to be low-power. In addition, it can be implemented as self-powered. The updating of the output device 14, 14' can also be stopped. This can be done for a specific period when it is known that code 12 will not be read. This can be, for example, a manually set period of time. This can also be, for example, a conforming power-saving state based on a photo-sensor 27 (FIG. 2) belonging to the electronic device 40. Then, when, for example, it is pitch dark, the output device 14, 14' is not updated. Further in addition, the criterion can also be based on temperature and/or vibration.

When the code 12 is to be displayed by the output device 14, 14' it can be, for example, set in a suitable manner described above. The output device 14, 14' displaying the code 12 in a passive state is also advantageous in terms of the usability of the system 10. The code 12 can then always be read when desired, without separate operations to bring it up. This property substantially accelerates the reading of the monitoring objects 20.1, 20.2.

Some examples of output devices 14 are display means based on electric-paper-display technology, which are generally known, for example, as e-Ink or e-Paper displays. One commercial example is the Good Display GDEW0154T8. The output device can also be some one-off output device 14' (FIGS. 8a-8c) or also, for example, a pulse display. Thus, the output device 14, 14' can be dynamic or static.

It is possible in the system 10 to use one or more reader device 13.1, 13.2 to read the code 12 containing data 19 from the output device 14 and which are thus arranged with the data transmission of the server arrangement 11. In addition, at least some of the reader devices 13.1, 13.2 can be also arranged to be in two-way data transmission with the server arrangement 11. The reader device can be, for example, a humanly operated reader device 13.1, for example, a portable mobile device with a camera, a "smart phone", a tablet device, or also, for example, AR or VR (Augmented Reality/ Virtual Reality) glasses. In the reader device 13.1, there are functions 28 for reading optical and graphical code 12 (for example, a camera, which is harnessed as a QR-code 24 reader and a property for processing QR-code for transmission/a service request) and/or it can produce an excitation for the output device 14. The function 28 can decode visual QR code 24 as data and in addition preferably send it to the internet address 67 (FIG. 4a) contained in the QR code 24.

The reader device 13.2 can also be automatic. It can be implemented using a camera connected to a data-transmission network and thus equipped with data-transmission means, which reads like a mobile device the optical code 24 acting as code 12 and/or is able to produce an excitation for the output device 14. The reader device 13.2, such as, for example, precisely a mobile device, can then monitor, for example, monitoring objects travelling on a conveyor belt, which it reads automatically as they move past the reader device 13.2.

The server arrangement 11 belonging to the system 10 is, for example, for processing and/or storing data 19 obtained through the reading of the code 12 from the electronic device 40. The server arrangement 11 can form a cloud system or service, which includes at least one server computer. The reader device 13.1, 13.2 transmits data 19 from the electronic device 40 to the server arrangement 11 as a result of reading the code 12. The server arrangement 11 then stores and processes the data 19 and also sends it forward if necessary, such as, for example, back to the reader device 13.1, 13.2. The reader device 13.1, 13.2 and the server arrangement 11 can be linked to each other, such as, for example, through a wireless data-transmission network, such as a mobile network.

Figure 2:
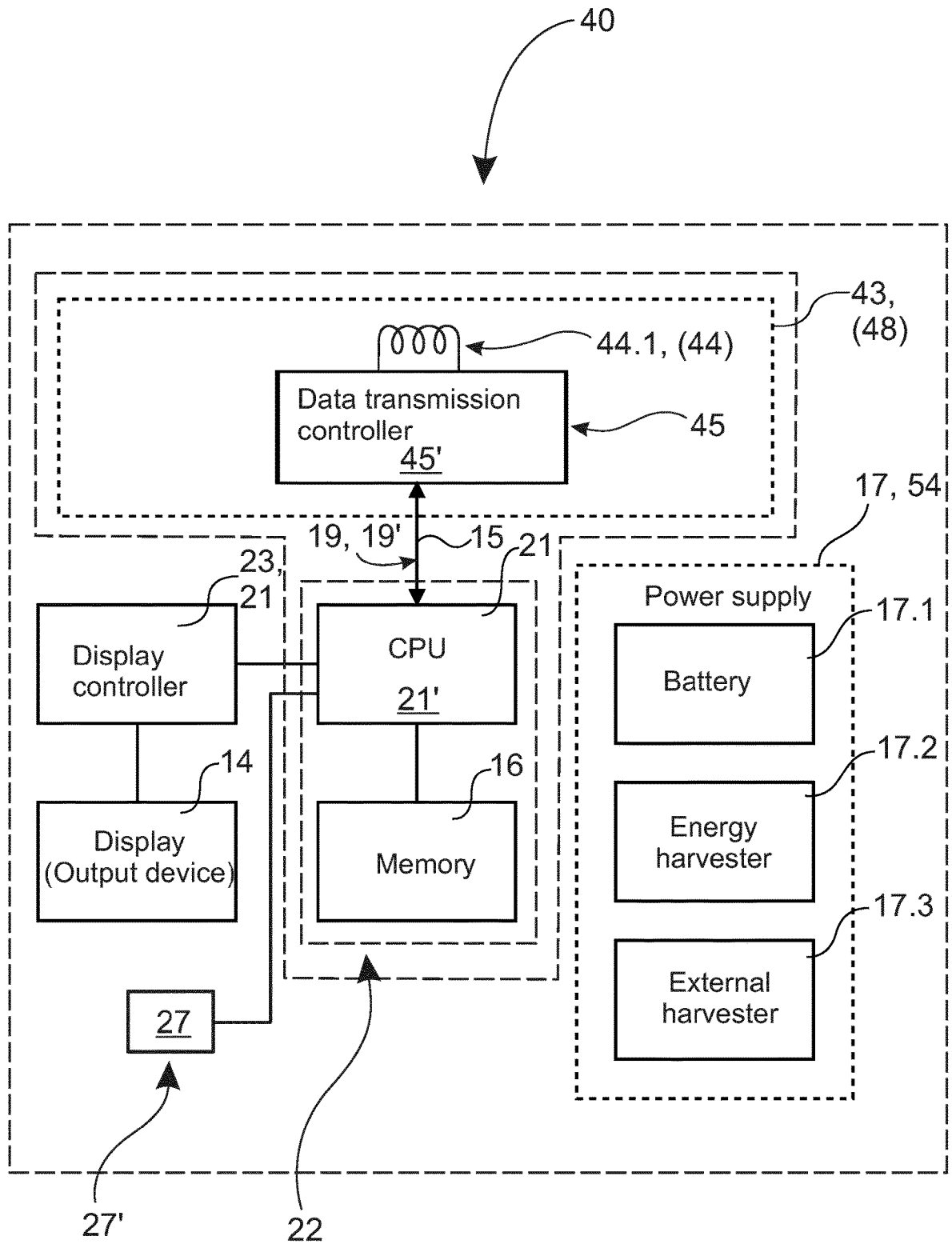
FIG. 2 shows a simplified diagram of one example of the electronic device, schematically as a block diagram.
Figure 8A:
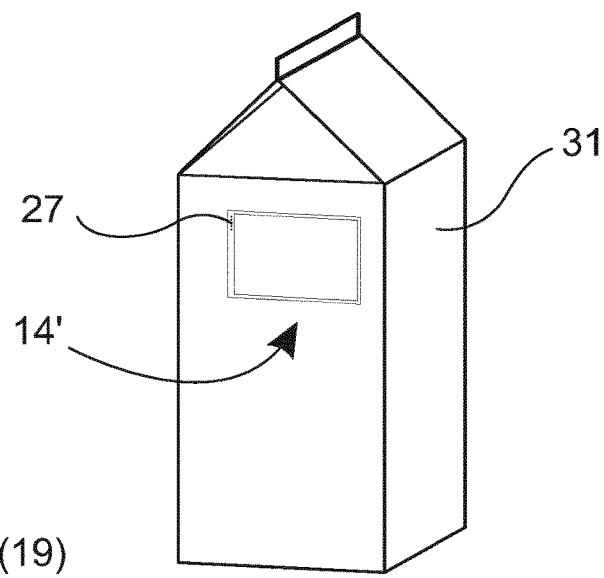
FIGS. 8a-8c show examples of a second embodiment relating to the implementation of the output device.
Figure 8B:
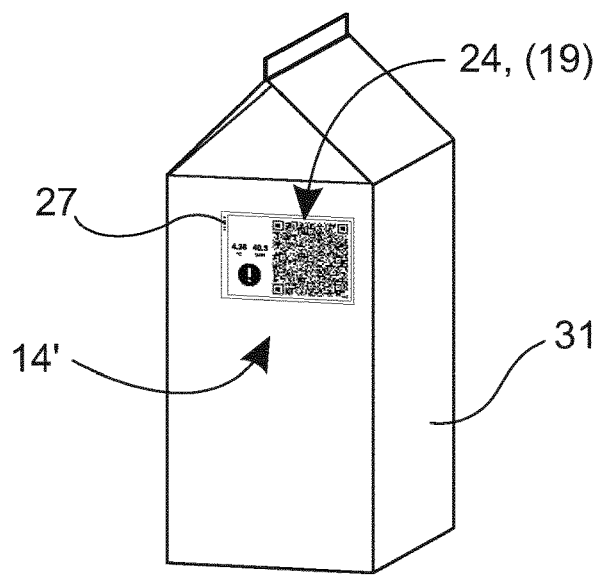
Figure 8C:
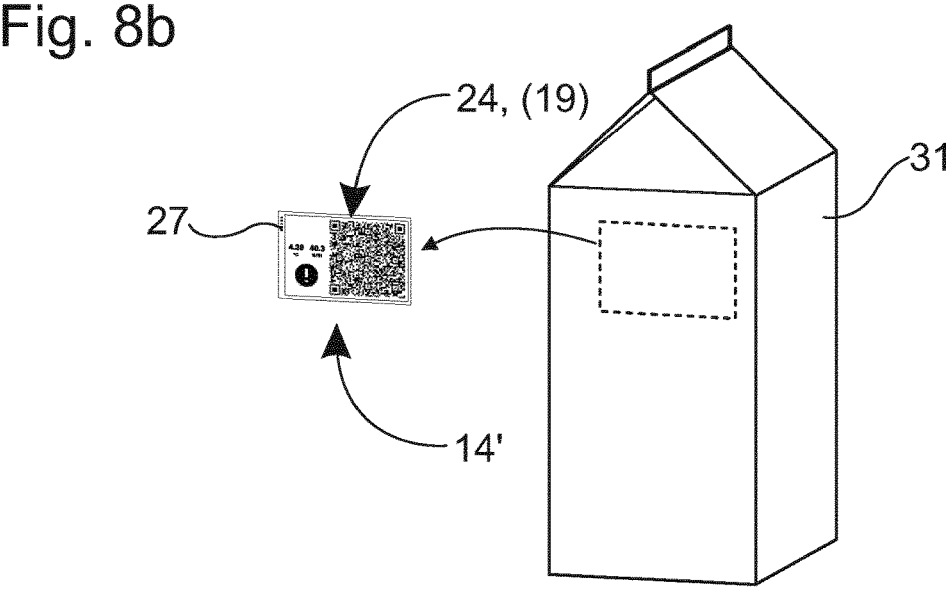

FIG. 2 shows schematically a simplified diagram of one example of the functions belonging to the electronic device 40. As already stated above, the electronic device 40 includes an output device 14, i.e. a display. For it is formed code 12, i.e. now optical QR code 24, acting as data-transmission code, which is then shown visually on the output device 14. The display can form at least partly of, such as, for example, an LCD display, as described hereinafter in the application, or as already stated above, a display that does not require electricity to keep patterns drawn on the display. Examples of such a display technology are displays based on electric-paper-display technologies (EPD), such as, for example, an e-Ink or e-Paper display. A single-use display, in which a pattern is drawn only once, can also act as the display technology. The drawing can of course take place in one or more stages, for example, in different areas of the display. FIGS. 8a-8c describe this embodiment in slightly more detail. The electronic device 40 can also be termed, in the context of the invention a tag, particularly a QR tag.

The electronic device 40 also includes, in addition to the output device 14, memory 16 for storing data 19, and processor means 21. The processor means 21 can be, for example, for processing the data 19. Data 19 can be stored and collected in the memory 16 in a set manner. From the data 19 stored in the memory 16 code 12, i.e. now QR code 24 for display on the output device 14, is formed, for example, by the processor means 21. The processor means 12 can also be to possibly encrypt the data 19 (for example, before forming the QR code 24).

The processor means 21 for processing the data 19 for the output device 14 and also for possibly encrypting the data 19 includes at least one processor 21'. It takes care of reading and receiving the data 19 from an external device 30 to be described in greater detail later in the application, of storing the data 19, of its possible encryption, and in addition of forming the code 12, an identifier code, used in optical data transmission on the basis of preferably encrypted data 19 intended to be transferred. The processor 21 can be, for example, on a processor card 22 and can contain the memory 16 needed for processing. The memory 16 needed to store the data 19 and the code 12 formed from it can be a separate memory or built into the processor circuit. In addition to the output device 14, the memory 16 too can be low-power. Examples of a processor circuit with such a low-power processor 21 are Texas Instruments' MSP440 series or the ARM Cortex M0+processor 25 MHz.

According to one embodiment, the memory 16 can be, for example, non-volatile memory. One example of this is FRAM-type (Ferroelectric Random Access Memory) memory. Here the term non-volatile refers to the memory not requiring to be continually refreshed to retain data in the memory 16, which helps to make it precisely low-power. The abbreviations F-RAM or FeRAM are widely used for other known FRAM-type memories, depending on their supplier. The memory can also be some other low-power memory only being developed that follows the same operating principle as known FRAM-type memory. These are characterized by the content of the memory being able to be changed using a relatively low power, compared, for example, to FLASH memories, which also helps to make the memory low-power. Resistive RAM-type memory (RRAM or ReRAM) is another example of a suitable low-power memory in place of a FRAM-type memory. Instead of a non-volatile memory other memories too can be used, which take only a little power for storing and/or maintaining memory, but which are nevertheless arranged to last for a reasonable period of use, such as, for example 0.5-3 years.

The processor means 21 too can be equipped with a power-saving property. According to one embodiment, it can have, for example, low-power modes (LPM), which, with the aid of interruptions, can switch off the processor when it is not required. It then consumes very little power, if any at all. FRAM-type memory has an operating voltage of, for example, 0.5-4 volts, particularly 1-2 volts, but clearly less than 10 volts, which is a typical voltage requirement of, for example, FLASH memory.

The electronic device 40 can also include a separate display controller 23, which controls the display, for example, on the basis of information obtained from the processor 21'. The display controller 23 can also be built into the processor circuit or into the display panel. The display controller 23 can also comprise processor means 21 for processing data 19. At its simplest, the data 19 processing is then the formation of QR-code 12 for the output device 14. The electronic device 40 can then in practice be even only an output device 14, without more particular processing capacity.

The electronic device 40 also includes means 54 for providing operating power. According to one embodiment, the means 54 can be, for example, a power supply 17. When necessary, the components and means belonging to the electronic device 40 get their operating electricity from the power supply 17. The power supply 17 can be, for example, a battery 17.1, an energy harvester 17.2, which can generate energy, for example, electromagnetic waves, vibration, light, or heat. Preferably, however, the power supply 17 is a local self-powered power supply. The electronic device 40 and possibly also the object 20.1, 20.2 can then be without a fixed mains-current supply for most of the operating time. The power supply 17 can be dimensioned to last for the duration of the measurement or the lifetime of the electronic device 40, for example, 0.5-3 years. The time taken to fill the memory 16 can also be used as a possible criterion for the duration of the measurement or the lifetime of the electronic device 40. On the other hand, the power supply 17 can also be replaceable. Further in addition, a super capacitor SC or other similar charger (FIG. 3e), for example, can also belong to the means 54 for providing operating power. If such is sufficiently large and slowly self-discharging it can even act as the only power supply, for example, in some application of short duration.

Figure 9A:
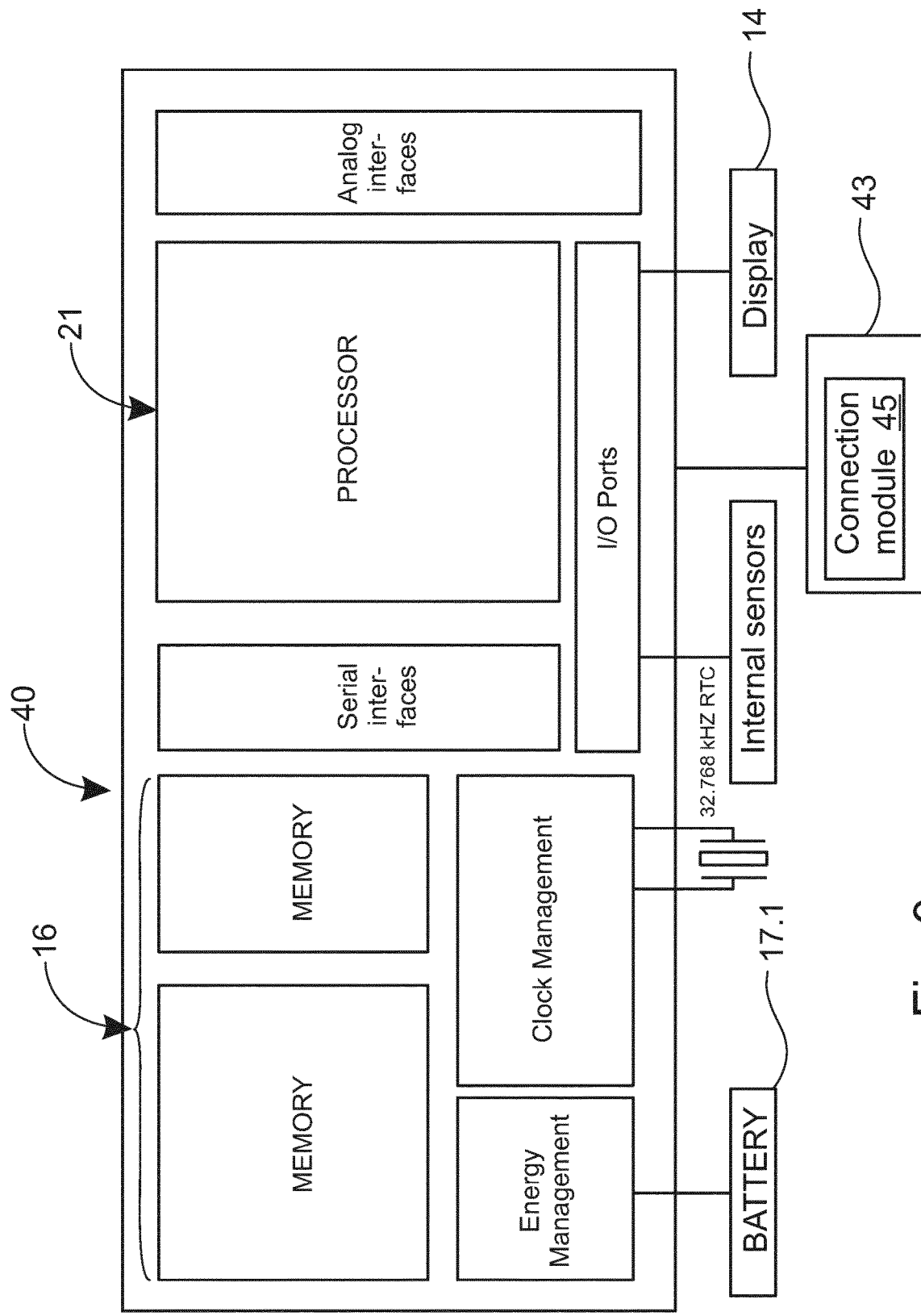
FIG. 9a shows a simplified schematic diagram of a second example of the electronic device, diagrammatically as a block diagram.
Figure 9B:
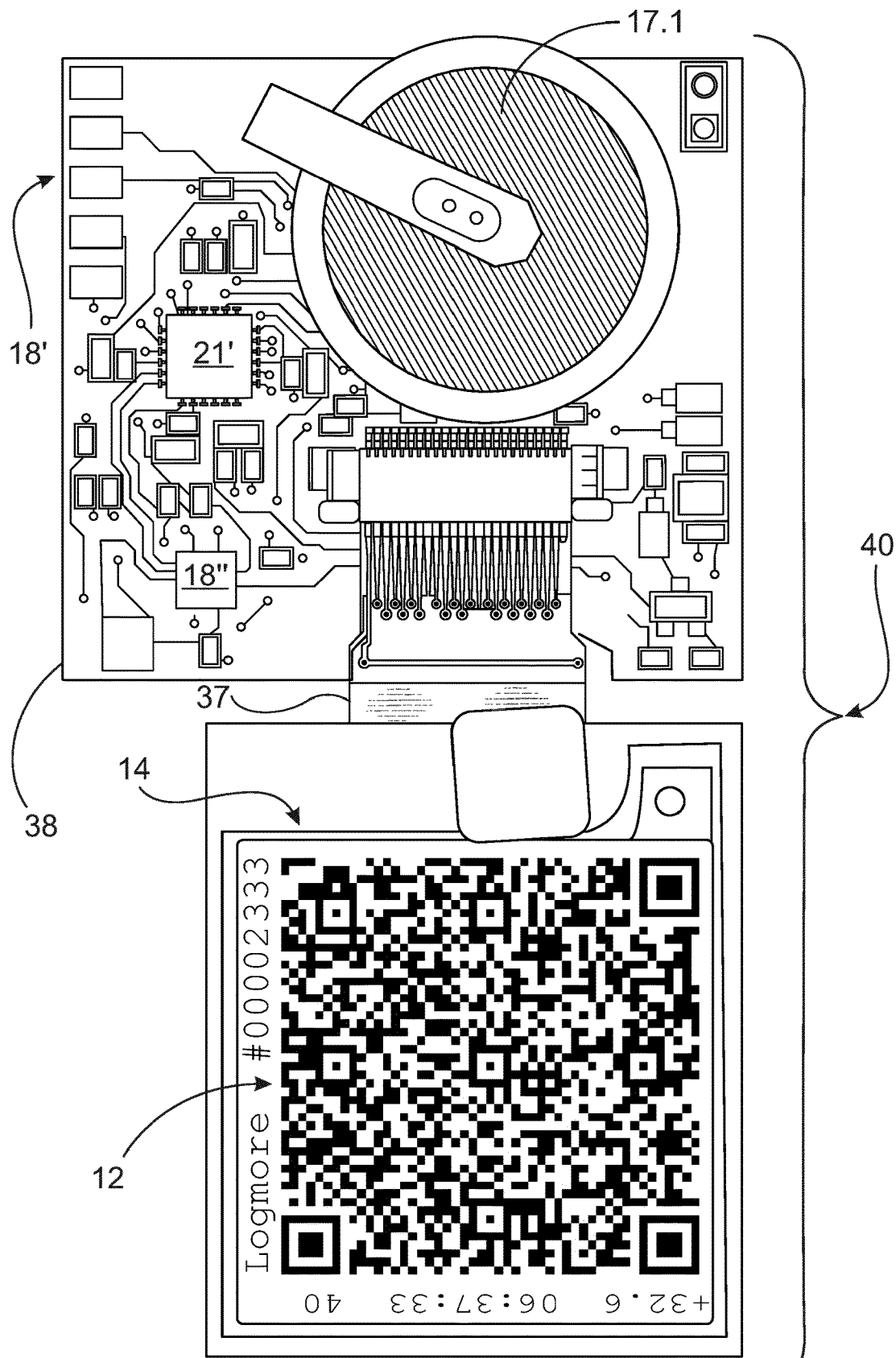
FIG. 9b shows one example of the electronics belonging to the electronic device.
Figure 10A:
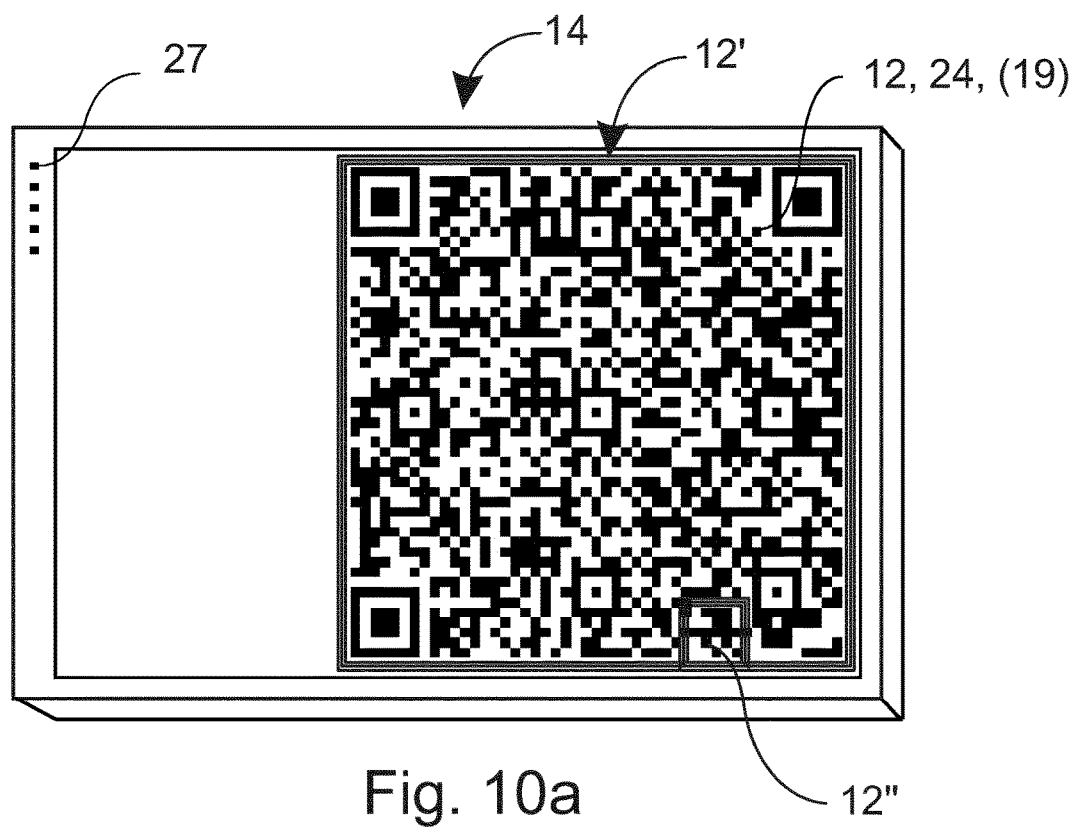
FIGS. 10a and 10b show some examples relating to machine-readable code, as low-current implementations.
Figure 10B:
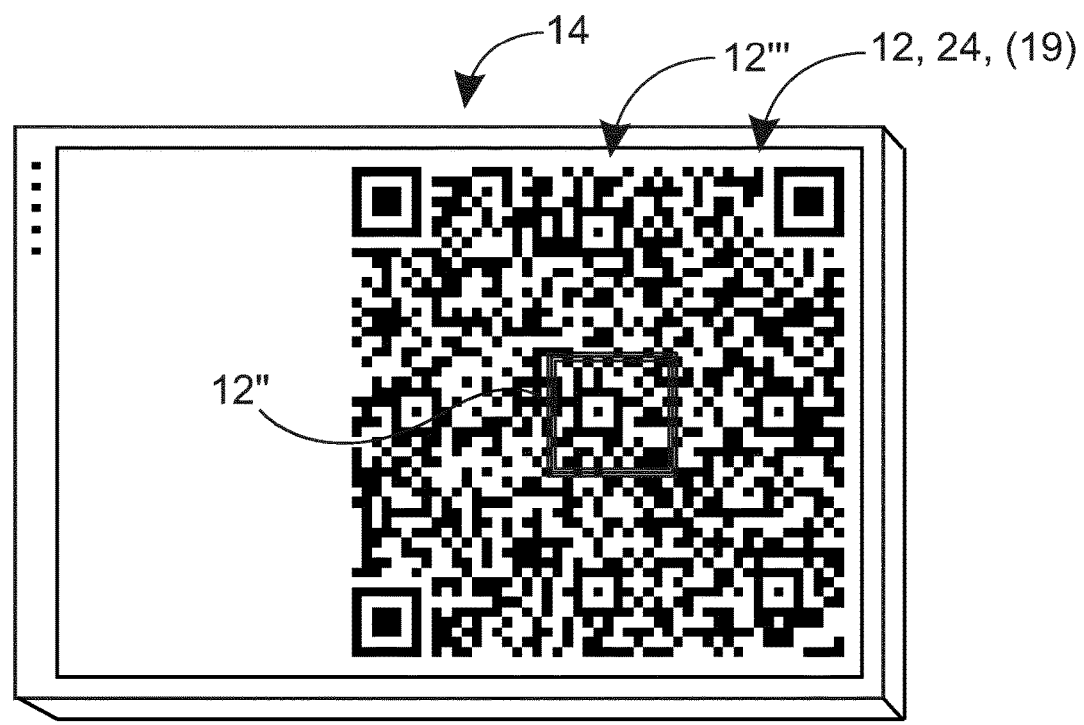

FIG. 9a shows a simplified schematic diagram of a second example of the electronic device 40 as a block diagram and FIG. 9b one example of the electronics belonging to the electronic device 40. In both figures the main components of the electronic device 40 are numbered with the reference numbering described above. FIG. 9b itemizes a battery 17.1 fitted to a circuit card 38, a CPU 21', a possible built-in temperature sensor 18", and programming pins and pins 18' for possible external connections with contacts. The output device 14 has a ribbon connection 37 to the card. In the electronic device 40, the output device 14 is folded from the ribbon connector 37 to the rear of the circuit card 38.

In addition, the electronic device 40 also includes a data-transmission interface 43 for arranging a data-transmission link 42 with one or more external devices 30. The data-transmission interface 43 and the data-transmission link 42 arranged through it are arranged to adapt the electronic device 40 to act as an user-interface to the external device 30. Thus, the electronic device 40 could equally well be termed a user-interface device.

In a case according to a first embodiment, the data-transmission interface 43 can also be regarded as a means 48 for collecting measurement data 19' for the electronic device 40. Thus, the measurement data 19' is one example of the data 19. The measurement data 19' is collected and then transferred to the electronic device 40 from the external device 30, by which, according to one embodiment, it can be measured and thus created. Instead of, or in addition to the measurement data 19', the electronic device 40 can read from the external device 30 not only measurement data but also, for example, alarms. This can be a question of, for example, the status of the alarm register of the external device 30. Information as to whether there are/are not alarms, and the reason for the alarm can be different examples of "measurable" data.

According to one embodiment, the data-transmission interface 43 can be wireless. It can then include an antenna structure 44 comprising one or more antennae 44.1 for forming a wireless data-transmission link 42. In addition, the data-transmission interface 43 can include at least one controller 45 arranged preferably for the wireless data-transmission link 42 with the external device 30. The controller 45 is arranged at least to receive and process data 19 received from one or more external devices 30 through the antenna structure 44. The data-transmission interface 43 can then be said to form, for example, a wireless sensor connection. The controller 45 is connected to the processor 21 over a data bus 15. If the processor 21 has such properties that it directly supports wireless data transmission itself, then the controller 45 is not necessary. The processor 21 in turn processes data 19 particularly for display on the output device 14. Thus, the electronic device's 40 output device 14 is intended for the reading, taking place using the reader device 13.1, 13.2 of the code 12 of the machine-readable code 12 containing data 19 created and/or received from the external device 30.

FIGS. 3a-3c show roughly on a schematic level some example of different implementation possibilities of the external device 30. In terms of the invention, the external device 30 can be implemented in several different ways. In the context of the invention, the term external device 30 refers to an external device physically outside the electronic device 40. According to one embodiment, the external device 30 can for its part include one or several formation means 18 for forming measurement data 19'. In addition, the external device 30 can further also include possible processor means 47. The processor means 47 are, for example, for processing the measurement data 19' formed by the formation means 18 and forwarding it to the electronic device 40. As explained hereinafter in the application, the processor means 47 can further also act in addition to, or instead of sending the measurement data 19' to the electronic device 40 in connection with reverse-direction data transmission relative to transmission. It is then possible to perform, for example, control of the external device 30 and/or the object 20.2. Parts 18 and 47 together with their possible memories 49 can also be termed a data-collection device or a data-logger. Thus, the formation means 18 can form measurement data 19' in a set manner continuously to monitoring the monitoring object 20.1 over a longer period of time, for example, in a logistics chain and collect the measurement data 19' in the external device's 30 memory 49.

The external device's 30 formation means 18 can be anything at all that produces data 19, such as, for example, one or more sensors 18.1 that produce measurement data 19', such as, for example, temperature, pressure, or moisture values. FIG. 3a shows an example of this. Some examples of sensors 18.1 are Si7055 (Silicon Labs) for temperature and BMA400 (Bosch Sensortec) for acceleration. In this the external device 30 is sensoring equipped with wireless data-transmission means 51. The wireless data-transmission means 51 now include an antenna 44.2 and a controller circuit 52 connected to the antenna 44.2 for wireless data transmission. The controller circuit 52 is in turn connected directly to a possible processor 47 or even directly to the sensor 18.1 itself. One application of FIG. 3a can be, for example, monitored objects 20.1 without intelligence or functions. One example is transport units. The external device 30 can then be, for example, attached to the transport package.

On the other hand, the formation means 18 can still be also a separate data source 18.2 relative to the external device 30, such as, for example, a link to another device, more generally to the monitoring object 20.1, such as, for example, an application device 50. FIG. 3b shows an example of this. There is then an interface 57 between the application device 50 and the external device 30 to connect them to each other. The formation means 18 can also be, for example, a data converter 18.3 arranged in the external device 30. It can, for example, listen to an external data source and convert the data 19 to be compatible with its processor means 47. A mathematical algorithm can also be understood to be a formation means. It can be used to form more refined measurement data from the raw data produced by the sensor data already in connection with the external device 30. In the embodiment of FIG. 3b, the sensor 18.1 of FIG. 3a is replaced with a link to an application device 50. Thus, the measurement data 19' comes from an external application device 50 instead of from a sensor 18.1 fitted to the external device 30. One example of an application device 50 can be an electric heater. The external device 30 is then arranged in connection with the electric heater, in which there can be its own measurement and control means for controlling its operation. The external device 30 can then collect, for example, measurement data 19' relating to heating. Control of the heating can also be possible, i.e. data transmission in the opposite direction relative to the retrieving of measurement data from the device 30/object 20.1, 20.2.

FIG. 3c shows a third embodiment example. In it the application device 50 itself acts as an external device 30 relative to the electronic device 40. I.e. here wireless data-transmission means 51 are integrated in the application device 50 as are, in addition, also possible sensor means for forming measurement data 19', if the object is also a monitoring object 20.1. Thus, here there is no need at all for a separate external module intended for data transmission between the application device 50 and the electronic device 40, as, for example, it was in FIG. 3b, instead it is found in the application device 50 itself. On the other hand, sensors 18.1 too and the associated processor and memory can be in the application device 50 itself. There is then an interface 57 between the application device 50 and the data-transmission means 51 acting as the external device 30 to connect them to each other. Thus, in terms of the invention the data formation element 18 can take very many different forms.

In the case of the above FIGS. 3a-3c, the question was of monitoring objects 20.1, related to which measurements were performed, thus creating measurement data 19'. However, the question could equally also be of control objects 20.2. The control of the objects 20.2 can be performed on objects 20.2 with or without the formation of measurement data 19'. In the case of control of objects 20.2, data transmission takes place mainly from the electronic device 40 to an external device 30, which is controlled or through which control is performed on the application device 50, i.e. the control object 20.2. The control can be, for example, using the electronic device 40 to set/change the settings of the external device 30 and/or an object 20.2 arranged in connection with it. In addition, control can, in the context of the invention, at its simplest be even only the transmission of data to the external device 30. The application relating to control will be returned to in greater detail later in the description.

Figure 12A:
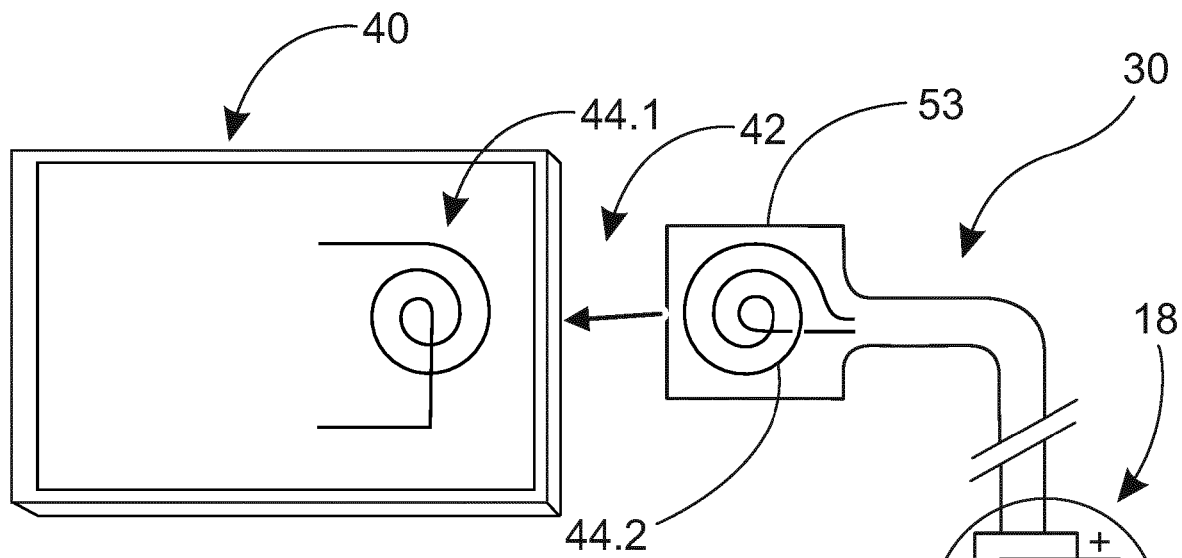
Figure 12B:
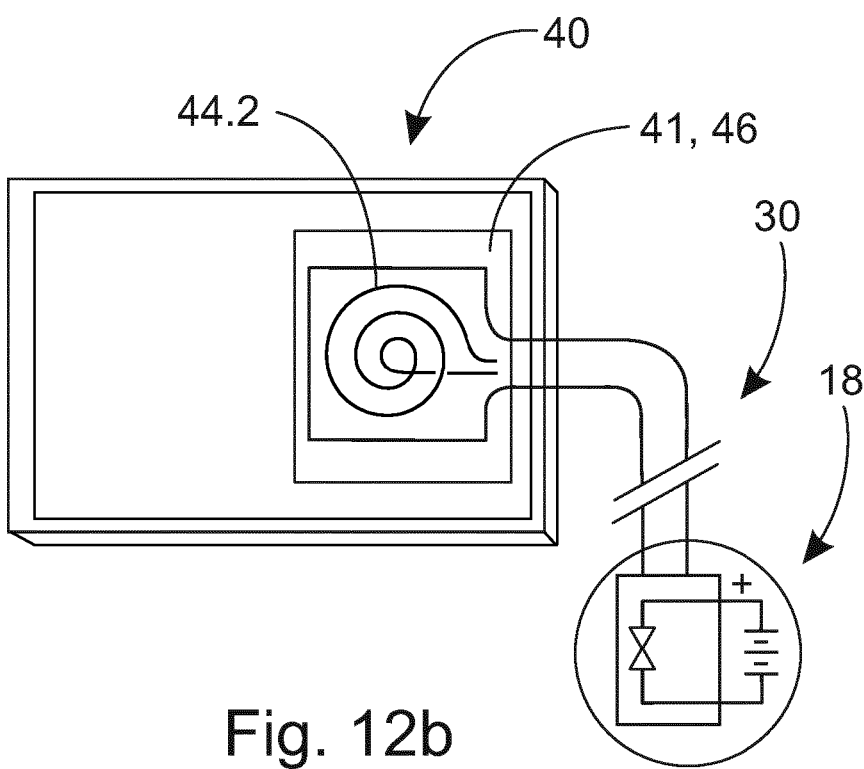

FIGS. 12a and 12b show a simplified schematic diagram of one way to arrange the connection of the electronic device 40 and the external device 30 to each other with a quick-release connector. In FIGS. 12a and 12b, the electronic device 40 is shown from its rear side, i.e. the output device 14 and the QR code 24 are on its opposite side.

According to one embodiment, the electronic device 40 includes, in addition, quick-release means 41 for connecting one or more external devices 30 for arranging a data-transmission link 42 with the electronic device 40.

The quick-release means 41 are now arranged in connection with the electronic device's 40 antenna structure 44. The quick-release means 41 can include, for example, an adhesive surface 46 fitted to the electronic device 40, arranged, for example, on the rear side of the electronic device 40. The adhesive surface 46 can also be, for example, a self-adhesive strip 53 in the external device 30, which includes the interface part of a sensor 18, i.e. the external device 30, i.e. now the antenna 44.2. In the electronic device 40 there are, in turn, reception parts 43.

The wireless data-transmission interface 43 can be implemented using an inductive and/or capacitive connection. The data-transmission interface 43 may have been arranged, for example in the case of inductive connection, to feed power to the external device 30 or also the other way around. Thus, at its simplest, the external device 30 does not need its own power supply at all. For example, when performing continuous measurements, the external device 30 can, however, be equipped with a self-powered power supply.

If the data-transmission interface 43 is implemented by inductive connection, the controller 45 can preferably be an NFC controller 45' (data-transmission frequency, e.g. 13.56 MHz). Its range can be, for example, a few centimetres.

Figure 3D:
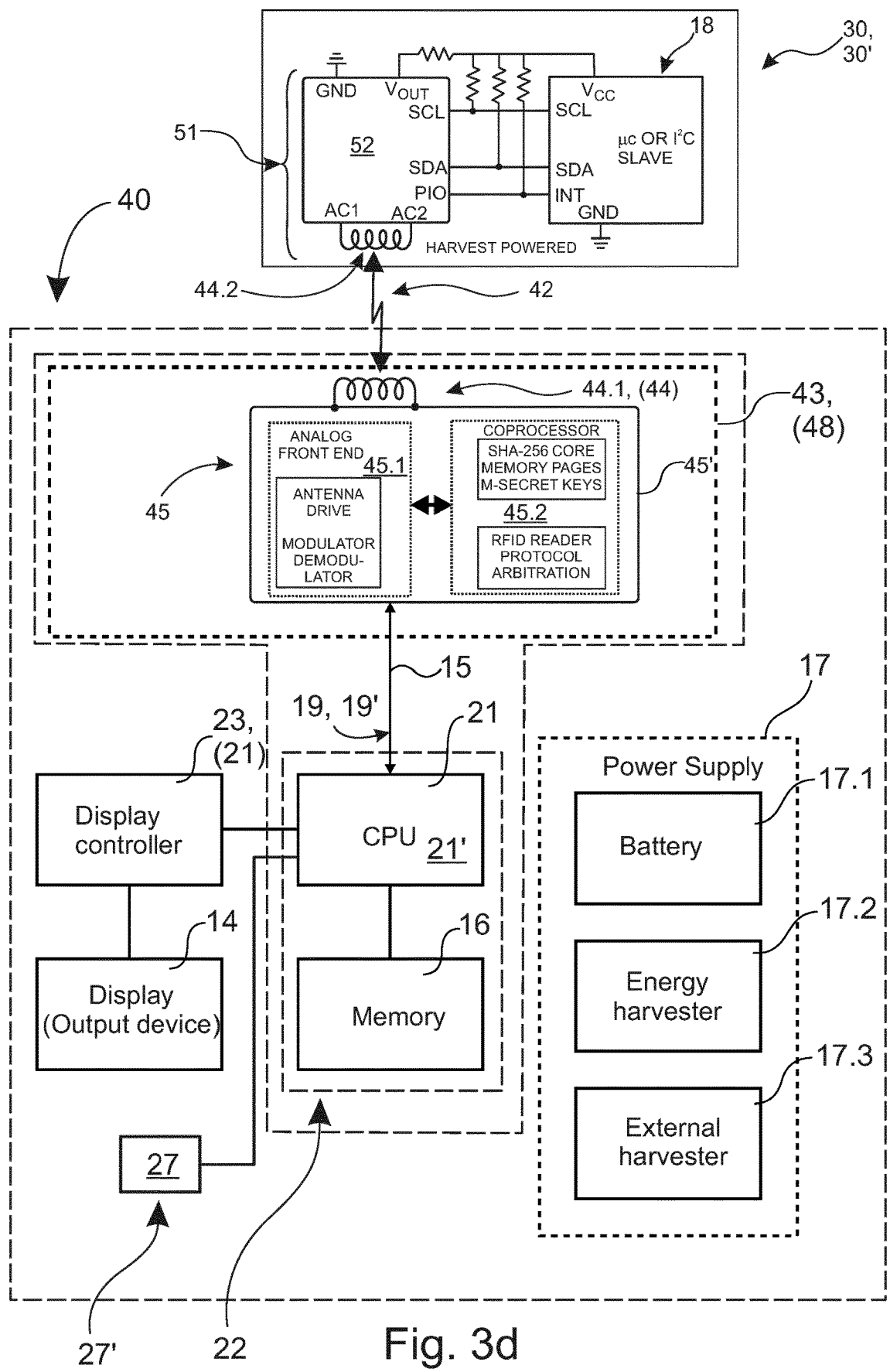
FIG. 3d shows a simplified diagram of one embodiment example of devices to be implemented by the invention, schematically as a block diagram.

FIG. 3d shows a simplified diagram of one embodiment of the devices 40, 30 implementing the invention, as a schematic block diagram. According to one embodiment, the electronic device 40 can be equipped with a Maxim circuit MAX66300 and the external device with a Maxim circuit MAX66242, which connects a wireless NFC/RFID interface with $I^2C$ interface. These can also be used to transfer power over the link 42. In this way an ecosystem can be created, in which different sensor manufacturers bring their own sensors 30 to be connected to the electronic device 40 by a connector according to set specifications, for example, by a quick connector. Being self-powered it can push data to the electronic device 40.

Figure 3E:
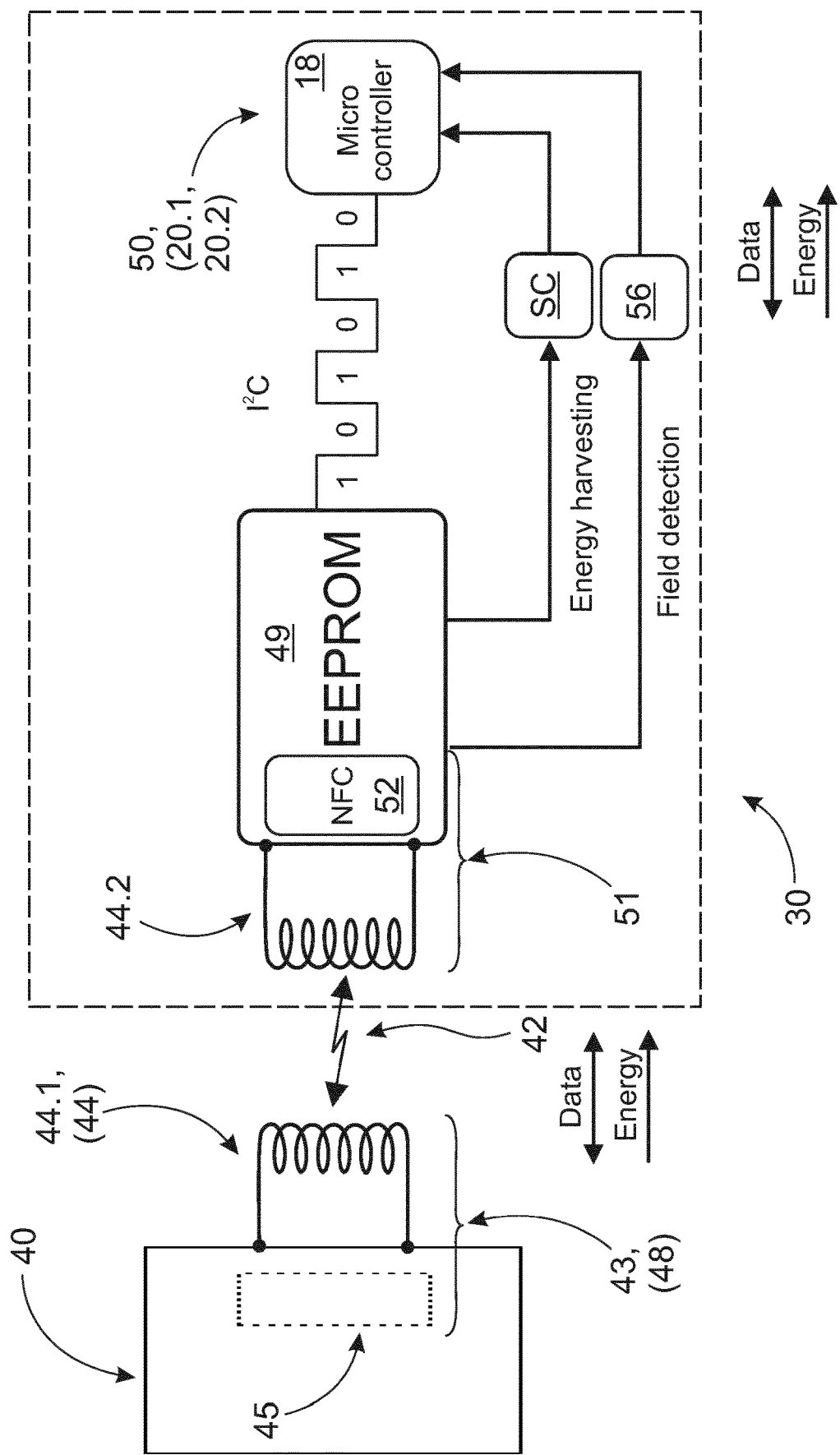
FIG. 3e shows a simplified diagram of another embodiment example of devices to be implemented by the invention, schematically as a block diagram.

FIG. 3e shows a simplified diagram of another embodiment of the devices 30, 40 implementing the invention, as a schematic block diagram. Now the main components in the external device 30 are a microcontroller 18 and memory 49. The microcontroller 18 acts as a sensor and makes the actual measurement. In addition, it may also prepare the measurement result and place it in its EEPROM memory 49. The electronic device 40 then reads the final result from the memory 49. Data can travel in both directions between the electronic device 40 and the external device 30. In addition, the electronic device 40 can form an energy field to energize the external device 30. The external device's 30 functional part (reference numbers 49, SC) in turn transmits energy to the microcontroller 18 (energy harvesting). In addition, it can further have a functionality 56 that excites the microcontroller 18 only when excitation is received through the data-transmission link 42 (field detection). Measurement can then be performed only in connection with excitation. Data transmission between the functional part and the microcontroller 18 can also be two-way. Data transmission can be arranged by the FC-protocol or some similar data bus.

In the above, the invention has been largely described as a wireless embodiment, i.e. as contactless between the electronic device 40 and the external device 30. Equally, contact between those parts can also be galvanic, i.e. solid, optical, or even acoustic.

In the above, the electronic device 40, external device 30, and data-transmission system 10 according to the invention are largely described as an embodiment in which the electronic device 40 acts as a master and the external device 30/object 20.1, 20.2 as a slave to it. This can also be the other way around. I.e. the external device 30 can equally act as a master to the electronic device 40. Also, in such an embodiment, for example, the super capacitor SC or other similar charger can act as the power supply when the electronic device 40 is used, for example, as a user interface for the external device 30 and/or the object 20.1, 20.2. This is particularly the case when the external device 30 and/or the object 20.1, 20.2 is itself in a fixed power-supply circuit. Then the external device, such as, for example, an electric radiator or frequency converter can generate only a carrier wave using its own antenna 44.2 or one of an external device 30 connected to it, and through it charge the electronic device's 40 super capacitor SC or some similar charger. Here therefore the controller 45 of the electronic device's 40 data-transmission interface 43 acts for a power-forming purpose. In other words, the data-transmission interface 43 is then arranged to receive power from the external device 30 to the electronic device 40. Thus, the electronic device 40 does not necessarily need another power supply at all, it can operate "eternally," and its price can be very cheap compared, for example, to a battery version.

The super capacitor or other similar power charger can also even be optional. Especially if power is only needed to update the machine-readable code 12 on the output device 14. Once it is updated power is scarcely needed for anything else on the electronic device 40, if its task is, for example, only to show the code 12 to the reader device 13.1, 13.2.

Figure 4A:
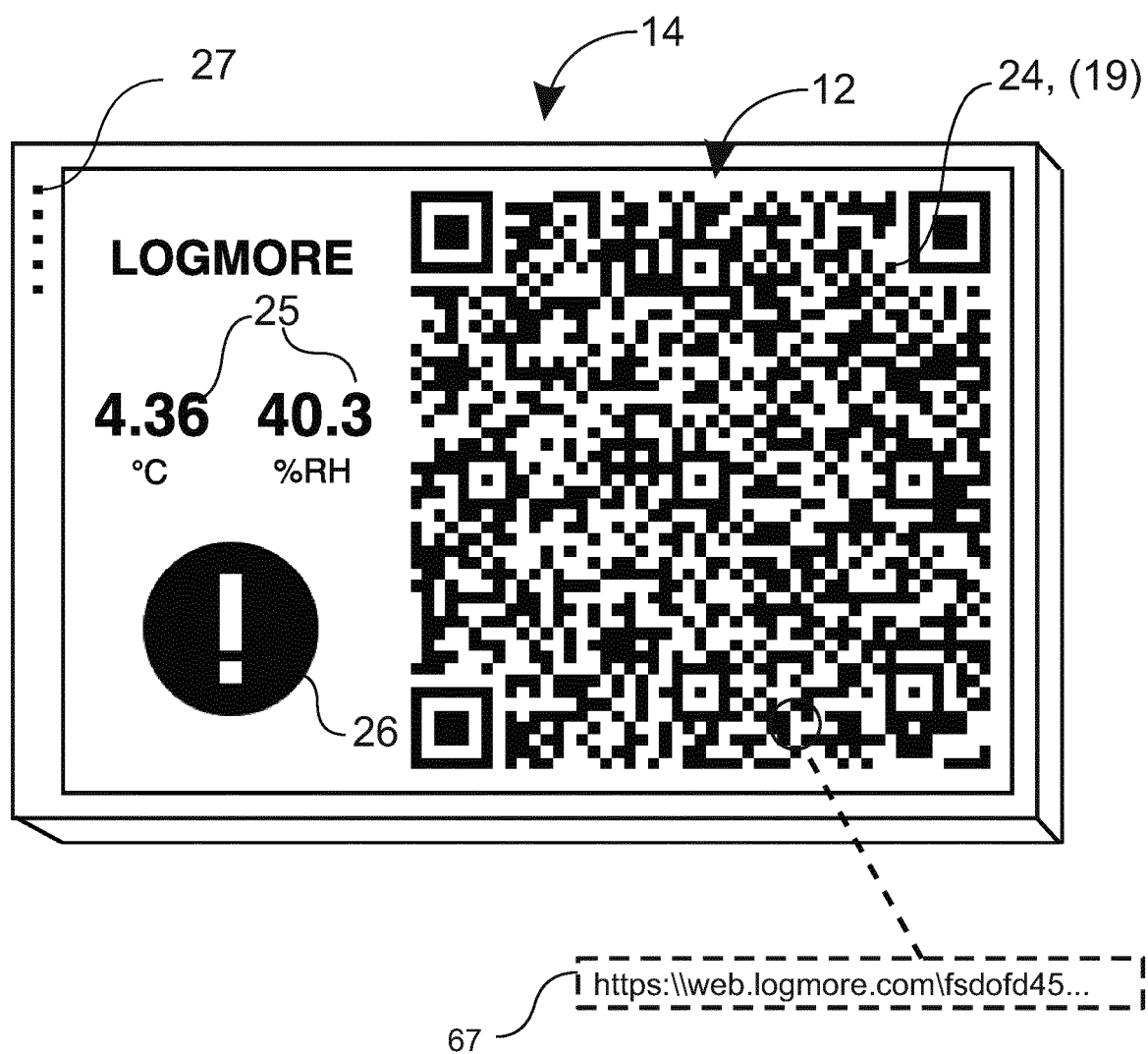
FIG. 4a shows diagrammatic example of the display device of the electronic device and of the code shown by it.

FIG. 4a shows a schematic example of the output device 14 and the code 12 shown on it. On the output device 14, a dynamic visual graphic element is shown as code 12, for example, QR code 24. The QR code 24, or more generally the code 12 can be visible continuously or it can be displayed only when necessary or when requested. In addition, the output device 14 can be used to show, for example, a momentary measurement value 25 relating to the external device 30 and/or the object 20.1, 20.2, which can be updated at intervals, if the electronic device 40 is statically connected to the external device 30 and/or object 20.1, 20.2. The data 25 and measurement data 19' can be, for example, temperature, moisture, acceleration, carbon dioxide, some electrical variable, or any other measurable variable whatever, or also the minimum, maximum, mean, or other historically-based value of a measurable variable, or the result calculated from a measurable variable. The data 25 can also be shown in clear text without QR code 24. Reading taking place, for example, using the reader device 13.1, 13.2 need not then be performed in every situation, such as, for example, to check only the status of the object 20.1, 20.2 or its momentary state data. This makes the system very flexible and user-friendly. Through QR code 24, it is in turn then easy to transmit to the server arrangement 11 and determine, for example, the history data relating to the object 20.1, 20.2, which can also be more refined.

In addition, for example, a visible warning sign 26 can be shown on the output device 14, the appearance of which can be programmed, for example, on the electronic device 40 and/or the external device 30. The warning sign can be shown, for example, if the temperature or sum of the exceeding of the temperature exceeds a predefined limit value.

According to one embodiment, means 27' are arranged in connection with the electronic device 40, arranged, for example, to detect a request forwarded by the reader device 13 to retrieve, for example, measurement data 19' from the electronic device 40 and/or from an external device and/or from the object 20.1 through the electronic device 40. Equally the same receiver means 27' can be used, for example, to set or change settings on the electronic device 40 and/or the external device 30 and/or the object 20.2. More generally, it can be stated that receiver means 27' are arranged in connection with the electronic device 40 to perform control and/or monitoring of the electronic device 40 and more particularly the external device 30 or the object 20.2 itself, i.e., for example, an application device 50 connected to it by the server arrangement 11 through the reader device 13.1, 13.2 and the electronic device 40. More generally, one can speak only of data transmission from the electronic device 40 to the external device 30/object 20.1, 20.2. For the receiver means 27' there can be, for example, an opening in the body of the output device 14, behind which can be found the sensor 27 necessary to excite the output device 14. The sensor 27 can be, for example, a microphone or photosensor, or magnetometer, when it can be deeper in, by which the reader device 13.1, such as, for example, a smart phone, can communicate, now particularly control, the output device 14 and thus also the electronic device 40. Thus, the phone is able, for example, to inform the output device 14 of a need to update the code 12 or to display the next code 12 in sequence. In addition, it is possible, for example, also to set the settings of the electronic device 40 and more particularly the external device 30 or of the monitoring object 20.2 itself, i.e. of an application device 50 possibly connected to the external device 30 or to transmit data to the external device 30 and/or the object 20.1, 20.2. To these embodiments will be returned slightly later in the description, at a suitable place for them. In the case of the photo-sensor 27 it can be in its commercial implementation, for example, a Lite-On LTR-408ALS-01. The receiver means 27' can also be an NFC communication module. The data transmission from the reader device 13.1, 13.2 to the electronic device 40 can then take place over an NFC link.

Figure 4B:
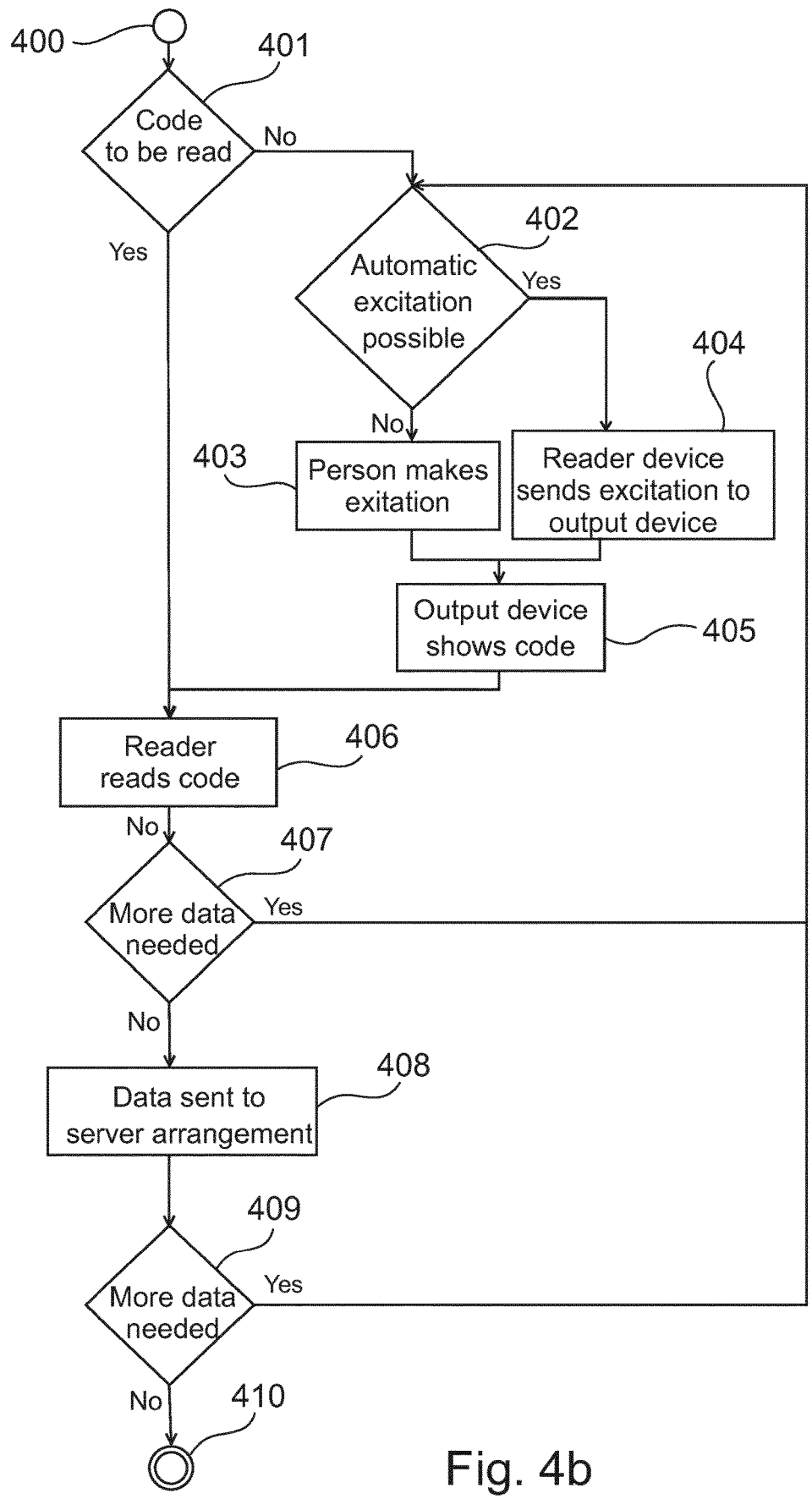
FIG. 4b shows the operation of the data-transmission system according to the invention, as a flow diagram in stages.

FIG. 4b shows the operation of the system 10 according to the invention as a flow diagram in stages between the electronic device 40 and the server arrangement 11, when it is wished to transfer measurement data 19 from a monitoring object 20.1 to the server arrangement 11. As stage 401, check whether visual visible code 12, intended to be shown on the output device 14, in which data obtained from the external device 30 and/or the monitoring object 20.1 is embedded, is to be read by the reader device 13.1. If it is not to be read, i.e. it is not, for example, visible, its excitation stages 402-405 are performed. As stage 402 is checked whether automatic excitation is possible. If it is possible, then as stage 404 an excitation is sent by the reader device 13.1 to the output device 14, resulting, as stage 405 it displays the readable code 12. If automatic excitation is not possible in stage 402, then as stage 403 a person makes the excitation, for example, by pressing a button in the output device 14. Again, as a result, as stage 405 the output device 14 displays the code 12.

If there has been code 12 to be read in stage 401 and also as a result of excitation procedure, as stage 406 the reader device 13.1 reads the code 12. If the server arrangement 11 having received the code 12 read by the reader device 13.1 and on the basis of the data transmission performed on its basis notes, as stage 407, that additional data is needed from the electronic device 40 and thus also from the external device 30, in connection with the electronic device 40 is now, then a return is made to stage 401.

As stage 408 data is sent by the reader device 13.1 to the server arrangement 11. As stage 409 the server arrangement 11 and/or the reader device 13.1 can examine from the read and/or sent data whether additional data is needed, i.e. is it, for example, possibly lacking. This can be seen from the data itself or then from the special code in the data, which expresses a lack of data. If more data is needed, then a return is made to stage 401.

Figure 5:
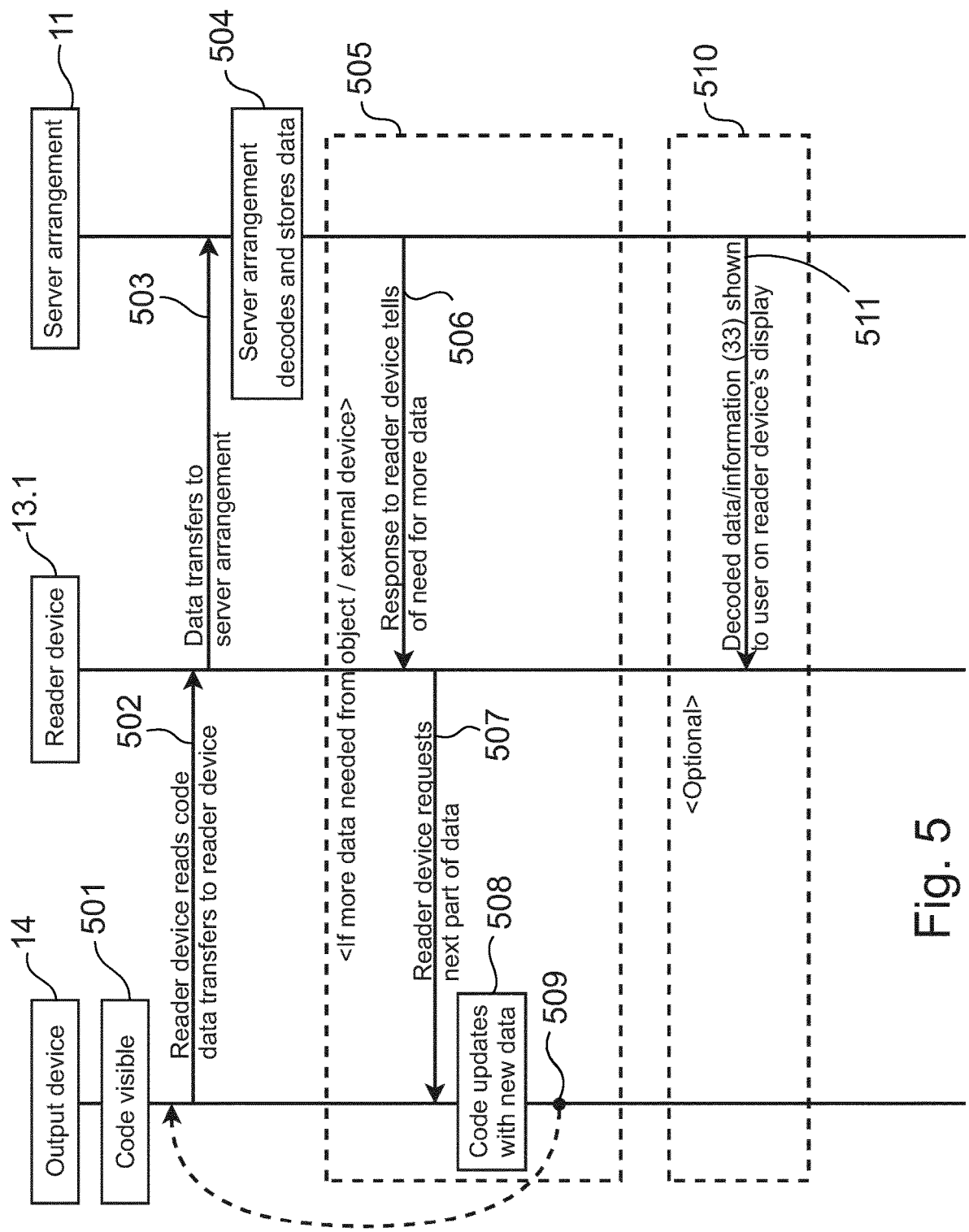
FIG. 5 shows a sequence diagram between the different parts of the data-transmission system, when processing data.

For its part, FIG. 5 shows a sequence diagram of the parallel time segments between the electronic device 40 and the server arrangement 11 belonging to the system 10. FIG. 5 shows the stages in the performance of one state-updating procedure. As stage 501 it is noted that there is optical QR code 24 visible all the time in the output device 14 to be readable using the camera of the reader device 13.1. Thus, the reader device 13.1 can read the QR code 24 at any time without a need to excite/inform the output device 14 of it beforehand. This in turn permits, for example, a zero-power passive state of the output device 14, 14', in which the code 12 can be displayed without essential power consumption.

As stage 502 the reader device 13.1, such as, for example a mobile device, successfully reads the optical code 12, such as, for example QR code 24, which is displayed on the output device 14 and the data is transferred through it to the reader device 13.1. The read data in the optical code 12 can be, for example, a web address 67 or other data. In the case of the web link 67 the measurement data 19', concerning the monitoring object 20.1 and/or the external device 30, to be sent to the server arrangement 11 is embedded, for example, in the web link 67 (FIG. 4a) contained in the QR code 24 shown in FIG. 4a. In a case in which there is no known web link 67 in the data contained in the QR code 24, there can be code in the reader device 13.1 that processes and sends the data in a set manner.

As stage 503 the reader device 13.1 sends the data to the server arrangement 11 through a data-transmission network, such as, for example a mobile network. If the QR code 24 contains a normal web link 67, when the user 29 once scans the QR code 24 and opens the web link 67 it defines, the data 19 decoded from the QR code 24 moves to the server arrangement 11 in the link 67 ("URL"), i.e. the call, automatically. The server arrangement 11 knows what electronic device 40 and/or external device 30 or object 20.1, 20.2 related to it the user 29 scanned, because the identifier ID of the electronic device 40 and/or external device 30 and/or object 20.1, 20.2 is also embedded in the read QR code 24 and thus also in the link decoded from it.

As stage 504 the server arrangement 11 receives, stores, and processes the data sent to it by the reader device 13.1.

If the data is encrypted, the server arrangement 11 also decodes the encryption. If the data is compressed, the server arrangement 11 also decompresses the data. The data read and sent by the reader device 13.1 is then stored in the server arrangement 11. At the same time, the user 29 can be directed to an information page maintained by the server arrangement 11, owing to the activation of the web link 67 contained in the QR code 24.

According to one embodiment, data transmission between the server system 11 and at least the electronic device 40 is arranged to be two-way and to take place preferably through the reader device 13.1, 13.2. Then data transmission between the server arrangement 11 and the reader device 13.1 and further between the reader device 13.1 and the electronic device 40 is also two-way. In addition, data transmission between the electronic device 40 and the external device 30 and thus also between the server arrangement 11 and the external device 30 can also be two-way. Data transmission between the server arrangement 11 and the external device 30 thus then takes place through the reader device 13.1, 13.2 and the electronic device 40. For this the data-transmission interface 43 of the electronic device 40 is arranged to form a two-way data-transmission link 42 between the electronic device 40 and at least one external device 30. Several different advantages are gained by two-way data transmission between the server 11 and the external device 30 and/or the object 20.1, 20.2. For example, the external device 30 (and thus also the object 20.1, 20.2) can be controlled by the server arrangement 11 through the reader device 13.1 and the electronic device 40, controlling of which the invention also permits. For example, besides setting settings, data can also be transferred to an external device 30.

In addition, the data sent to the server arrangement 11 can also contain, for example, header information as to whether the monitoring object 20.1 has still more data available than could be sent already in one QR code 24. Thus, the server arrangement 11 can decide whether there is a need to obtain more data from the electronic device 40 and the external device 30 and/or the object 20.1, in connection of which the electronic device 40 is arranged. Thus, the server arrangement 11 is arranged to detect a need to retrieve measurement data 19' from the external device 30 and/or the object 20.1 according to the reader device's 13.1, 13.2 code 12, for example, from the previous transmission.

If the server arrangement 11 decides that all the necessary data has been already stored in the server arrangement 11, more data is not needed. However, if it is decided that more data exists/is needed, the server arrangement 11 can send the reader device 13.1 a call to read additional data as a transmission-request response in the process 505. The reader device 13.1 is then arranged to transmit a request from the server arrangement 11 to the electronic device 40 to retrieve measurement data 19' from the external device 30 and/or the object 20.1, 20.2. The request to retrieve measurement data 19' from the external device 30 and/or the object 20.1, 20.2 through the electronic device 40 is arranged to be formed and transmitted in response to the code 12 read already previously by the reader device 13.1, 13.2 and the transmission i.e. handshaking made on its basis.

As stage 506 the reader device 13.1 receives a request formed and sent by the server system 11 to retrieve and read more data from the electronic device 40 and more particularly from its output device 14 or through it from the external device 30 and/or the object 20.1, 20.2. Preferably, however, all the data of the external device 30/object is read at one time to the electronic device 40, after which the link between them is no longer needed, at least to transmit measurement data 19'. The reader device 13.1 receives the request and forms on its basis a set-type signal command to be transmitted to the electronic device 40. If additional data is not needed the server arrangement 11 simply acknowledges that the data-transmission procedure has ended successfully.

As stage 507, the reader device 13.1 sends the electronic device 40 a command, such as, for example a light signal, sound signal, or directs the reader device's 13.1 user 29 to press a set button in the reader or electronic device 13.1, 40 to form a command and present it to the electronic device 40 and more particularly to its output device 14. By the command, the reader device 13.1 thus requests the next or some of the data 19 of the external device 30 and/or the object 20.1, 20.2 requested by the server arrangement 11 from the electronic device 40.

As stage 508 the electronic device's 40 output device 14 updates the optical code 12 with the next batch of data. Once the code 12 is updated, as stage 509 a return is made to stage 501, in which the code 12 containing the next batch of data 12 can be read by the reader device 13.1 from the electronic device's 40 output device 14. Stages 502-504 repeat, as above. This process can be continued as long as desired/as is necessary.

According to one embodiment, as stage 510 context data 33 relating to the object 20.1, 20.2, to be displayed by the data-formation means 32' of the reader device 13.1, 13.2, is arranged to be transmitted to the reader device 13.1, 13.2, as part of the two-way data transmission. Of course, it is possible to transmit the context data as far as even the external device 30/object 20.1, 20.2 through the electronic device 40. The server arrangement 11 can display this data 33 to the user 29, for example based on the user's 29 access rights level. According to one embodiment at least some of this context data 33 may have been formed on the basis of the code 12 read by the reader device 13.1, 13.2 using the server arrangement 11 and of data processed from it. Thus as a result of the reading of the QR code 24 to the server arrangement 11 the data sent to and possibly processed there and/or data refined from it, more generally the context data 33 can, if necessary, be transmitted as stage 511 to the reader device 13.1 and, for example, displayed directly to the user 29 on the reader device's 13.1 display 32 in clear text, such as, for example as a web page (in html form). At its simplest, the data can also be, for example, an indication of an unbroken cold chain, if a logistics monitoring object requires this. On the basis of the data the products of the monitoring object can be either approved for use, if the cold chain has been preserved, or alternatively rejected/directed to further investigation, if the cold chain is shown to have broken. Generally, the display 32 can be termed a data-formation means 32'. Then at least some of the reader devices 13.1, 13.2 can be equipped with data-formation means 32'.

Figure 7:
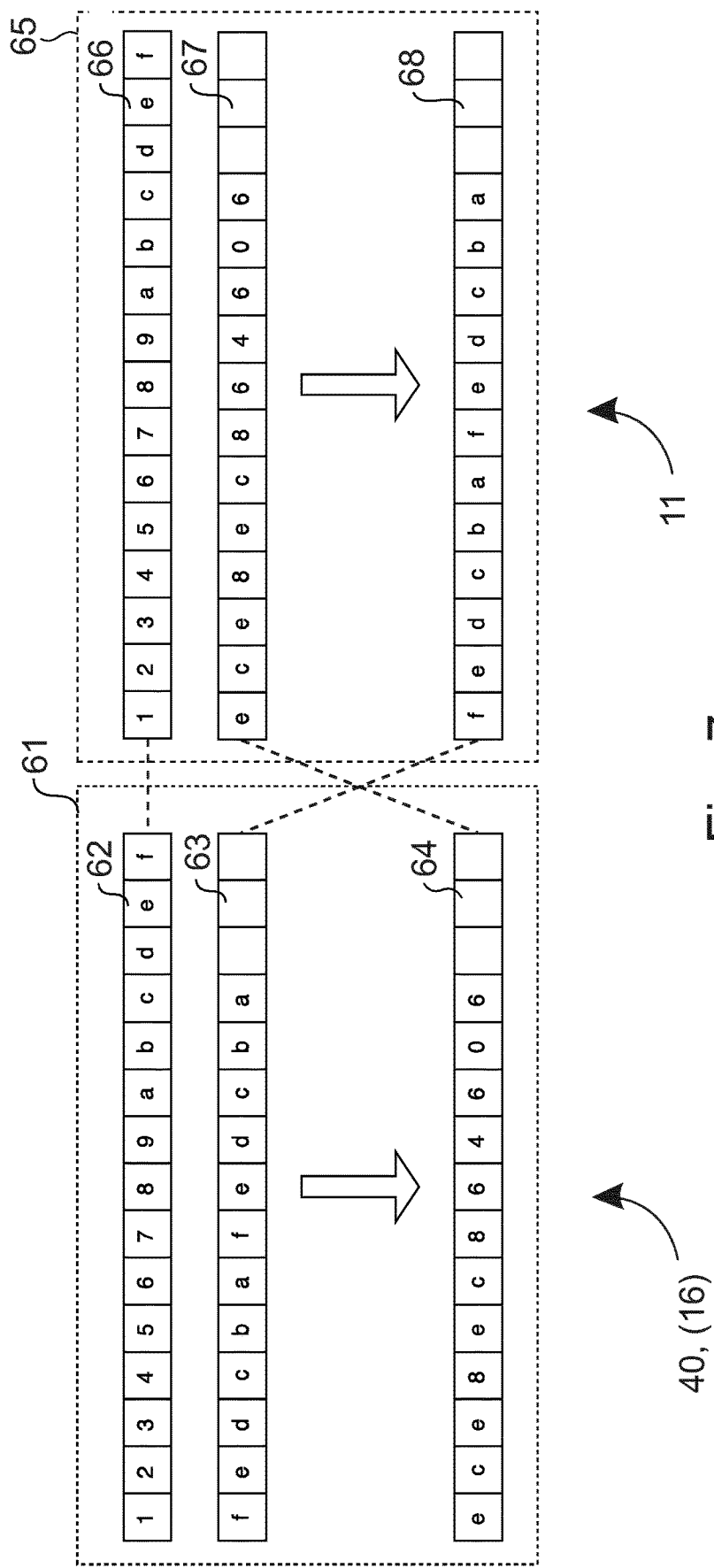
FIG. 7 shows an example of the encryption method used in the invention in encryption and in decrypting encryption.

FIG. 7 shows an example of a low-power and thus also energy-efficient encryption method to be possibly used in the invention, first in the encryption of data 63 in the left-hand block 61 of the figure using an encryption key 62 and then the decryption of the encryption in the right-hand block 65 by the server using an encryption key 66. Thus, the electronic device 40 is, according to one embodiment, arranged also to encrypt the measurement data 19', which has been sent from the electronic device 40 to the server arrangement 11 as its form, i.e. on the basis of reading the QR code 24.

Block 61 is performed in connection with the electronic device 40. The encryption key 62 can be the size of the electronic device's 40 entire memory 16 and, for example, a single-use random number queue. The size of the memory 16 can be, for example, 200 Mb or even 1 Gb, when the length of the encryption key 62 will also be corresponding. The data 63 to be encrypted can be data to be stored/stored in the electronic device's 40 memory 16, and can be, for example, temperature measurements of the object 20.1, 20.2 performed by an external device 30. The data 63 to be encrypted and the encryption key 62 are combined here using an XOR operation, when encrypted measurement data 64 is obtained. The encrypted measurement data 64 is also stored in the electronic device's 40 memory 16. The encrypted measurement data 64 can replace the memory locations of the encryption key stored in the electronic device's 40 memory 16 as they are used. In other words, the encrypted measurement data 63 is then written on top of the single-use encryption keys 62 as the encryption key's characters are used. Thus the memory 16 can be utilized very efficiently. At the same time, the encryption keys 62 are destroyed owing to the encryption and the encrypted measurement data 63 can no longer be opened, even though the electronic device's 40 memory 16 could be read.

The encryption keys 62, 66 can be random numbers, which are also stored in the server arrangement 11. The encryption keys 62 are run into the memories 16 of the electronic devices 40 in their manufacturing stage. Each electronic device 40 is thus an individual, which has a unique random number queue as an encryption key. The server arrangement 11 has information on the individualized electronic devices 40 and the encryption keys 66 in each of them. The encrypted measurement data 63 is in the electronic device 40, but after encryption no external party can open it without the encryption key 62, on top of which the encrypted measurement data is advantageously stored in the memory. If for some reason data transmission to the server arrangement 11 does not succeed, the measurement data is, however, in the electronic device's 40 memory 16 nor can it be read until the encrypted measurement data 63 has been transmitted to the server arrangement 11 on the basis of the QR code 24.

Block 65 shows the decryption of the data using the encryption key 66. This takes place by the server arrangement 11. The encryption key 66 of each electronic device 40 can be stored in the server arrangement 11, so that encrypted data 67 sent to the server arrangement 11 can be decoded to the original measurement data 68 using an XOR operation. The encryption then also permits the authentication of the monitoring object or product 31. In other words, from a specific electronic device 40 should come data from a specific numerical area, which is defined by the encryption key arranged for the electronic device 40 in question. The encrypted measurement data can also contain character bits to perform authentication. If the encrypted measurement data is, for example, 8-bit, then 7 bits of it can be encrypted measurement data and 1 bit a character bit, taken from a corresponding location in the encryption key. Because the server knows what the character bit should be at the location in question, then it is also able to confirm the origin of the encrypted measurement data, i.e. that it is from the correct electronic device 40. Thus, the monitoring object 31 can also be arranged to be confirmed on the basis of the encryption. Complex computing or encryption algorithms are not needed in XOR encryption. It can be implemented using a light processor implementation and is light to implement also in terms of its data-processing demands. Yet another advantage is that it has no need to encrypt the encryption algorithm itself, because there is not one. The leak of an encryption key or measurement data from one electronic device 40 will not help in opening the measurement data of other electronic devices 40.

FIGS. 8a-8c show examples of yet another embodiment relating, for example, to a possible implementation of the output device 14' and also the implementation of the monitoring of an object. Here the embodiment example is a refrigerated consignment 31. According to one embodiment, the output device 14' can also produce one-use printouts. Even a clear text document can then be printed out for the recipient of the consignment 31, which, for example, shows information relating to the consignment 31, such as, for example its route and temperature history, and/or confirm the consignment to be an authentic product in origin. Here the output device 14' is arranged to be a means such as paper or a similar one-use printout, on which, for example, by a physical (for example, matrix or heat), chemical, and/or electrical effect information can be formed of measurement data 19 formed by an external device 30 and/or in the object 20.1, 20.2 and/or processed from it. The single-use printout means, such as, for example, thermo-paper, can preferably be detached from the monitoring object 20.1, for example, when monitoring ends. Here too, a QR code 24 can first be read by a mobile phone and sent to the server arrangement 11, which confirms to the recipient of the consignment 31 that the data is authentic.

In FIG. 8a a package 31 is being transported and during it the output device 14' possibly arranged on the package is passive. It can then be empty of data to be shown. Measurements relating to the package 31 and its environment (temperature) are, however, made the whole time during transportation and are stored in the memory 49 of the external device 30 using the formation means 18.1 (FIG. 3a) arranged in connection with the package 31.

In FIG. 8b the package 31 has arrived at its recipient. The recipient can, for example with the flash of his mobile device or some other light signal, excite the output device 14' possibly arranged in the package 31, for example through a photosensitive sensor 27 integrated in it. As a result of the excitation, a QR code 24, generally code 12, appears on the output device 14' to be read by the mobile device, and in addition, for example, its momentary temperature value. The recipient can, in the manner already described above, confirm the history data contained in the QR code 24 relating to the package 31 by reading the QR code 24 with the mobile device, which then sends the measurement data 19' contained in the QR code 24 for example encrypted to a web address 67 defined in the QR code 24, which is addressed to the server arrangement 11. The server arrangement 11 decrypts measurement data 19 contained in the QR code 24 into clear text and then returns it to the mobile device thus confirming at the same time the origin of the data shown on the output device 14' and of the package 31 in general.

According to FIG. 8c, the possible output device 14' can also be detached from the package 31. Its recipient then gets it for themselves, for example for their own archiving requirements. The possible output device 14' described in this embodiment is thus single-use, so that it is very cheap and thus suitable for mass-produced products.

The single-use output device 14' can be drawn, for example in the case of its QR code 24, one or several times, i.e. it can be printed out cheaply in a batch of one or many. The QR code 24 can then be drawn first on part of the output device 14' and the other parts of the area of the output device 14' designated for the QR code 24 remain still empty of it. Data can be later added to the QR code 24, i.e. the empty areas can still be filled in. Thus, the various parts of the visual code 24 can be filled by utilizing at the same time the error-correction algorithms of the QR code. The reader device 13.1, 13.2 can also take this into account when reading the codes 24, which are updated and also completed in the manner described above.

Figure 8D:
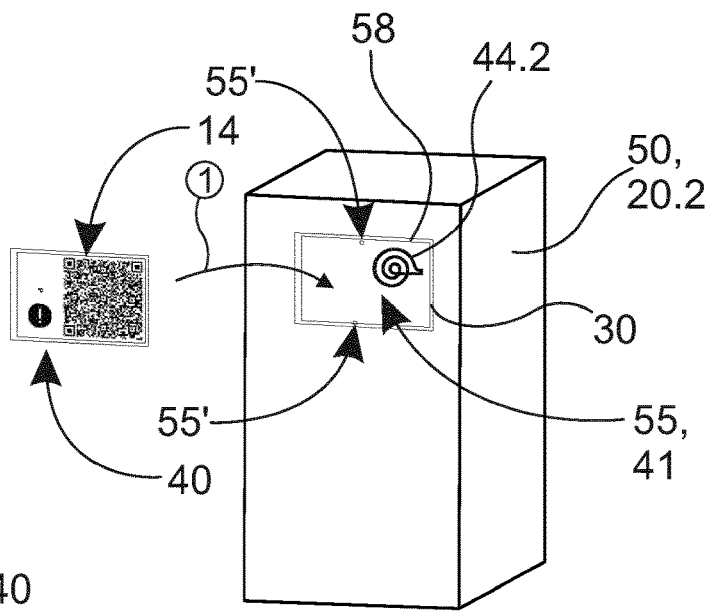
FIGS. 8d-8f show examples of a second embodiment relating to the implementation of the data-transmission system.
Figure 8E:
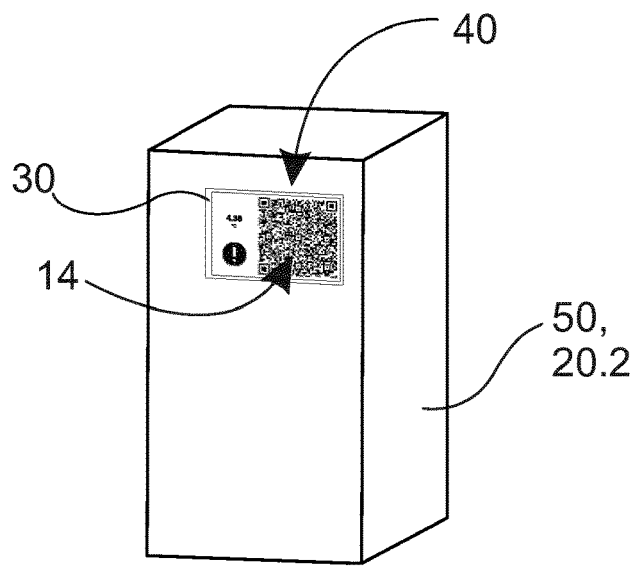
Figure 8F:
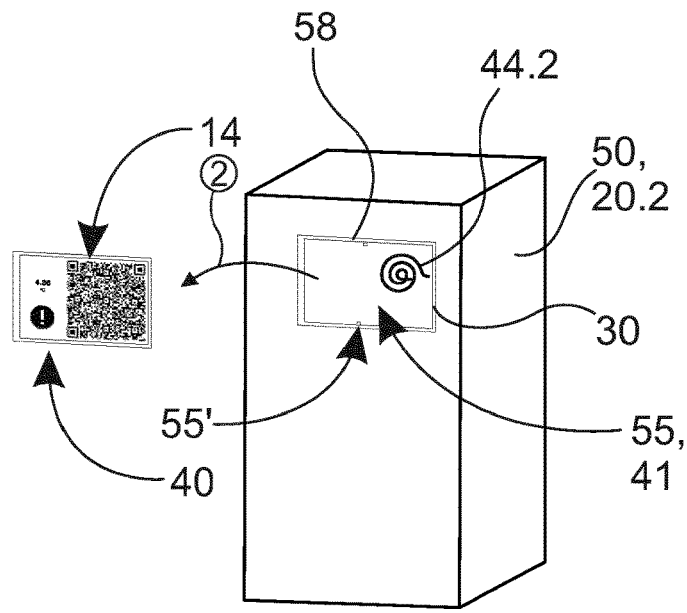

FIGS. 8d-8f show an example of a second embodiment relating to the implementation of the data-transmission system 10. Now the device 50, for example a frequency converter, can be equipped with an external device 30 arranged to only perform measurements, or a contact module permitting data transmission, which can also be understood as an external device 30 (FIG. 8d). Measurement data 19' and, for example, other status data can then be read from the device 50 at any stage at all of the life cycle of the device 50 using the electronic device 40, which is brought close to the device 50 or attached to a place 55 (FIG. 8e) arranged for it in connection with the external device 30 to the device 50. The electronic device 40 can be attached with a detachable quick-release fastening to the place 55. For this purpose, the place 55 can have a shape-locking connector arrangement 55' for the electronic device 40, which acts as a quick-release means 41. Thus, the electronic device 40 can be set in place 55, for example, by pinching. The place 55 can have, for example, depressions at its edges, by which the electronic device 40 can be detached from the place 55 by finger force without tools (FIG. 8f). In addition, the antennae 44.1, 44.2 can then be arranged relative to each other in such a way that they are standardized and compatible in terms of data transmission.

The place 55 can be formed on a base 58, such as, for example, a plate, in which a depression arranged in the plate forms the place 55. The connector arrangements 55' are protrusions formed at the edges of the depression, to which the electronic device 40 is detachably installed by shape-locking. Here the base 58 thus forms an installation adapter for the electronic device 40 for arranging measurement/data transmission to an external device 30/object 20.2. The base 58 is in turn attached to the casing of the device 50, in which there can be a data-transmission interface to the device 50 itself.

Thus, the object 20.2 can be read, for example, for its part of a measurement data 19' or data can also be transmitted to the object 20.2 by any electronic device 40 whatever. On the other hand, one electronic device 40 can also be used to read any other object (FIG. 1, object 20.2) equipped with any external device 30 whatever. The devices 30, 40 are thus interchangeable. The external device 30 can then be a very simple mass-produced measurement sensor or a data-transmission module, in which there are functions and properties for performing measurement and storing measurement data and/or performing data transmission to an electronic device 40 and/or object 20.1, 20.2 using a set protocol. Despite its simplicity, measurement data 19' is obtained easily from such an external device 30 owing to the invention and then to a server arrangement 11, because the electronic device 40 can be used as a user-interface means of the external device 30 and in the final resort also of the object 20.1, 20.2. Thus the one-off cost per monitored object is almost non-existent, nor does it limit the making of measurements and the utilization of measurement data 19' for mass-produced products, for example, compared to that each object 20.1, 20.2 would be equipped permanently with electronic device 40 equipped with corresponding sensing and comprising an output device 14. Instead of reading data, the data transmission towards an external device 30 and/or object 20.1, 20.2 is equally possible, thus permitting, for example, control of the object.

Owing to the invention, data transmission can take place mainly automatically and securely by reading only the visual code 12 and opening/approving next the URL link 67 (FIG. 4a) embedded in it. This makes the system 10 easy for the user 29 to use. Authentication can then also take place automatically by the information needed for identification being already combined in the visual code 12.

The invention also permits the position data of the object 20.1, 20.2 to be defined using the reader device 13.1, 13.2. Once the user 29 has downloaded the server arrangement's 11 web page on the reader device's 13.1, 13.2 browser as a result, for example, of stage 503 of FIG. 5, the server arrangement 11 can request position data from the user 29, for example, using an HTML5 geolocation API. This makes it possible to locate the reader device 13.1, 13.2 and thus also the monitoring object 20.1, 20.2 without any additional software being installed in the phone acting as reader device. The HTML5 geolocation API can equally well use, for example, GPS and other positioning methods. Once the user 29 has accepted the sharing of the phone's i.e. the reader device's 13.1. 13.2 position data at the same time in connection with the reading and the following sending of the data, the position of the electronic device 40 is also stored in the server arrangement 11. In the same way, the server arrangement 11 knows the electronic device's 40 scanning locations, which can also then be drawn on a map.

As an embodiment belonging to two-way data transmission, the server system 11 may also have been arranged to control the operation of the external device 30 and/or the object 20.1, 20.2 through the reader device 13.1, 13.2 and the electronic device 40. Control of the electronic device 40 itself is, of course, also possible. Thus, one or more operations, generally data, are arranged to be transmitted from the server system 11 to the external device 30 and/or object 20.1, 20.2, through the reader device 13.1, 13.2 and the electronic device 40. Using two-way data transmission, for example, by the control of the server arrangement 11 the electronic device 40, the external device 30, and/or the object 20.1, 20.2 are excited and/or the output device 14 in turn to update the code 12. It is then possible to combine time-stamp combined data precisely, without the electronic device 40 and/or the external device 30 having their own clock at the correct time. In other words, it is then a question of also synchronizing the external device's 30 clock. This too saves energy.

Two-way data transmission according to the invention also permits the settings and other values in the memories 16, 49 of the electronic device 40 and/or the output device 14 and/or the external device 30 and/or the object 20.1, 20.2 to be changed by the control of the server arrangement 11. One can also speak of the programming/configuration of the electronic device 40 and/or external device 30 and/or object 20.1, 20.2, i.e. the changing/setting of its settings, for example, in connection with its start-up and/or operation.

Figure 6:
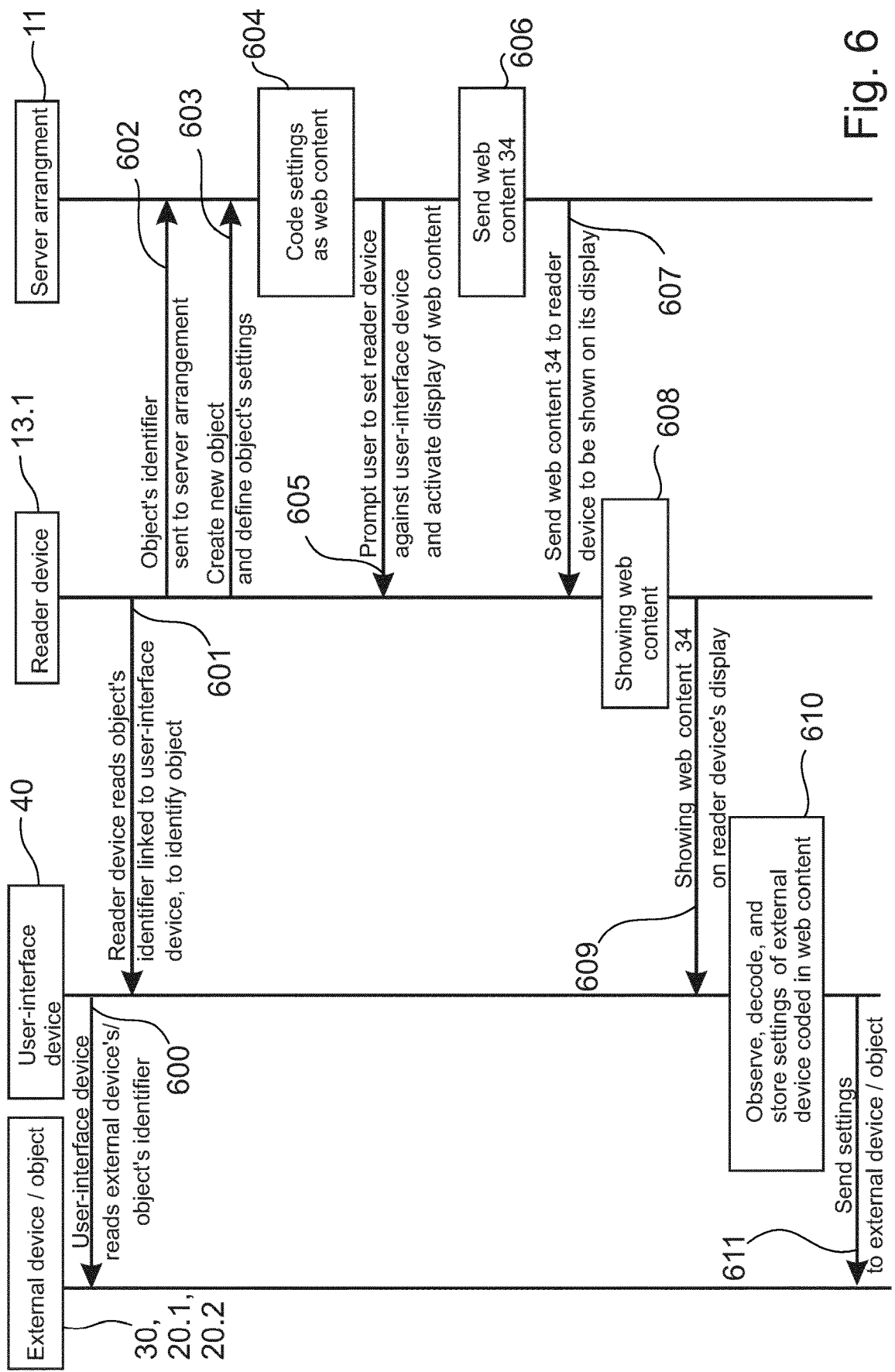
FIG. 6 shows a sequence diagram between the different parts of the data-transmission system, when setting settings of the external device.

FIG. 6 shows one example of the configuration of the external device 30 and/or object 20.1, 20.2, for example in connection with their start-up or reprogramming. Here too two-way data transmission between the server arrangement 11, the electronic device 40, the external device 30, and thus also the object 20.1, 20.2, transmitted by the reader device 13.1, 13.2, is utilized. In other words, here data transmission from the server arrangement 11 to the external device 30 and/or the object 20.1, 20.2 also takes place through the electronic device 40. In FIG. 6, the term user-interface device is used for the electronic device 40.

Before the programming of the external device 30 and/or the object 20.1, 20.2 to be performed by the server arrangement 11 through the reader device 13.1, 13.2 and the electronic device 40, the reader device 13.1, 13.2 is arranged to control the server arrangement 11 to program the external device 30 and/or the object 20.1, 20.2, for example in connection with their start-up and/or changing their settings. One can also speak of defining the settings of the external device 30 and/or object 20.1, 20.2 and storing them in the server arrangement 11 by the reader device 13.1, 13.2. Right at the start, for example as stage 601, however the object 20.1, 20.2 itself can be identified. There are several different ways to do this. It can be done, for example, by using the reader device 13.1, 13.2 to read from the object 20.1, 20.2 a bar-code identifier or other similar identifier or to form data relating to it by the action of the user 29 on the reader device 13.1, 13.2 then to transmit the identification data of the object to the server arrangement 11 as stage 602. The object can, of course, be identified only in connection with the definition of the setting of the electronic device 40 and/or external device 30 arranged to be connected to it, or even as a separate operation after it. The ID identifier of the electronic device 40 intended to be connected to it and/or of the external device 30 or the waybill of the object can equally well act as the object's identification. As a result of the identification of the object, a specific, for example, monitoring object (e.g., a package or pallet) can be linked to the electronic device 40 arranged in it and/or the external device 30. In other words, as a result the server arrangement 11 knows at any moment, to which object the code 12 formed and displayed at any moment by the electronic device 40 relates. One simpler way to identify the object 20.1, 20.2 is to arrange the electronic device 40 in connection with the external device 30 and/or object 20.1, 20.2, when the external device 30/object 20.1, 20.2 sends its identification data to the electronic device 40 (stage 600). A QR code 24, which is read by the reader device 13.1, 13.2 is then formed from it. As a result of reading, a website opens, in which the settings of the external device 30 and/or object 20.1, 20.2 can be set.

By means of the controlling of the server arrangement 11 by using reader device 13.1, 13.2 to program, more generally to set the settings of the external device 30 and/or the object 20,1. 20.2, the system's 10 user 29 can, for example, set or change the settings of the external device 30 and/or the object 20.1, 20.2, or change any information whatever relating to the external device 30, which is needed, for example to perform a measurement and/or to display information on the object formed of it on the electronic device 40. The settings can be defined on a web page formed by the server arrangement 11, which is shown of the reader device's 13.1, 13.2 display 32, the settings made on it being then stored in the server arrangement 11. The user 29 can select on the web page formed by the server arrangement 11, for example "configure object" and define the settings from the web page as stage 603. Such a settings can be, for example, the measurement interval or some other one or several equipment setting, relating, for example, to the external device's 30 formation means 18. However, it must be noted in the context that the invention also relates equally to the control of the external device 30 and/or the object 20.1, 20.2. The one or several settings in question can then relate to the operation of the object 20.1, 20.2 itself, without any particular measurement monitoring the object 20.1, 20.2. Thus, owing to the invention it is possible to also change the settings relating to the object 20.1, 20.2, which can be the most diverse, depending on the object. Applications relating to this are described hereinafter in the description.

Other possible settings can also be, for example, relating to the electronic device 40, the display's 14 update interval, and/or the battery-saving settings. Instead of the reader device 13.1, 13.2, settings can, of course also be made for the server arrangement 11, for example, centrally from some external device. As stage 604, for example, a visual presentation or similar, for example a web content to be shown on a web page are formed of settings by the server arrangement 11. More generally the server arrangement 11 is arranged to form web content 34, in which settings are coded, to be shown by the reader device 13.1, 13.2. Instead of, or in addition to a visual presentation the content 34 can also include, for example, sound.

As stage 605 the user 29 can be prompted to set the reader device 13.1, 13.2 and the electronic device 40 to each other so that content-data transmission between them, i.e. programming can be performed and prompt the user 29 to activate the downloading of web content created by the server arrangement 11 and show it on the reader device's 13.1, 13.2 display 32.

Once the user 29 has defined his desired settings on the server arrangement 11 the user 29 can as a result of stage 606 download them to the electronic device 40, for example from a web page formed as stage 604 by the server arrangement 11 on the reader device 13.1, 13.2. This can be done, for example, by the reader device's 13.1, 13.2 web browser 39 (FIG. 1), i.e. without any other equipment, cables, or special properties or software required by this from the reader device 13.1, 13.2. Thus, as stage 606 and 607 the server arrangement 11 sends to the reader device 13.1, 13.2 web content 34, as a result of which the reader device 13.1, 13.2 is arranged to receive the web content 34 from the server arrangement 11. As stage 608 the reader device 13.1, 13.2 is arranged to show on its display 32 the web content 34 settings of to be entered in, i.e. transmitted to the electronic device 40 and then also forwarded to the external device 30 and/or object 20.1, 20.2. Thus the setting/changing of the settings of the external device 30 and/or the object 20.1, 20.2 arranged to be performed through the reader device 13.1, 13.2 includes the entering of settings received from the server arrangement 11 to the electronic device 40, which can take place, for example, as a visual presentation or other content 34 to be displayed, for example, on a web page formed by the server system 11.

More particularly, the server arrangement 11 sends, as stage 607, a web page to the reader device 13.1, 13.2, in which there is content, such as, for example, an area that, for example, flashes white and black. Thus, the data sent by the server arrangement 11 to the electronic device 40 can be encoded, for example, as white and black flashes of light of different length. Once the user has set, as a result of stage 605 the electronic device's 40 reception means 27', such as, for example, a photo-sensor 27, on display 32 of the phone, portable computer or desktop PC, generally the reader device 13.1, 13.2, in which is the flashing area of the web page formed by the server arrangement 11 and sent to the reader device 13.1, 13.2, the settings data is transmitted to the electronic device 40, because the reader device 13.1, 13.2 sends as stages 608 and 609 the content to the electronic device 40. The reader device's 13.1, 13.2 data formation means 32', i.e. display 32 is then surprisingly also used as data-entry means 32" (also referred to herein as data transmitter) to transmit the setting data to the electronic device 40 for performing the control of the external device 30 and/or object 20.1, 20.2 using the reader device 13.1, 13.2. More generally, as the reader device's 13.1, 13.2 data-entry means 32" (data transmitter) is arranged to act an element 32* arranged to create light, such as, for example, the display 32 of the reader device 13.1, 13.2. For example, the sound source belonging to the reader device 13.1, 13.2, for example a loudspeaker, can also be used here for the same purpose. The web content 34 can be in the format of, for example, a YouTube video, or even more simply a simple animation appearing on a web page. The animation can include a frame that flashes white and black.

In stage 610, the electronic device 40 receives data through a flashing light on a photo-sensor 27 that belongs to the electronic device 40. The electronic device 40 then decodes the settings from the content 34 arranged to it and possibly stores them in its memory 16 for transmission to the external device 30 and/or the object 20.1, 20.2 over a data-transmission link 42. Thus, the electronic device 40 is arranged to detect the web content 34 shown on the display 32 of the reader device 13.1, 13.2 and decode from it the settings concerning the external device 30 and/or the object 20.1, 20.2. As stage 611 the settings are transmitted from the electronic device 40 to the external device 30 and/or the object 20.1, 20.2 over a data-transmission link 42. Measurements are performed on the external device 30 and/or the object 20.1, 20.2 and the operation of the external device 30 and/or the object 20.1, 20.2 is then controlled according to those settings.

In other words, the data transmitted to the external device 30 can originate from the web or also directly from the electronic device 40. From the user's 29 viewpoint, the programming situation runs, in a simplified form, in such a way that first, for example, the QR code 24 showing the identification of a radiator on the electronic device's 40 output device 14 is scanned, the URL address 67 embedded in it is opened, new settings for the radiator are selected in the web browser 39 of the reader device 13.1, 13.2 on the web page generated from it content comprising, for example, light flashes concerning new settings are received by the reader device 13.1, 13.2 from the server arrangement 11, by the reader device's 13.1, 13.2 light are flashed the new settings to the electronic device 40, the electronic device 40 is connected (if it is not already) for data transmission to the radiator, i.e. the external device 30, and the radiator is configured according to the new settings. After this, the electronic device 40 can connect directly to the next radiator to be programmed. This next radiator configures without the reader device 13.1, 13.2 having to do anything any more. Instead of settings, more generally only data can be transmitted to the external device 30/object 20.1, 20.2 in this way. Here the settings are only one special example of an application of the data.

In this way, an external device 30 and/or object 20.1, 20.2 can be configured using the server system 11, for example with the aid of a web page created by it, wirelessly and easily through a web page, by using the display 32 of the reader device 13.1, 13.2 and a photo-sensor 27. The data transmitted through flashing lights can further also be encrypted so that erroneous configurations cannot be made from other sources and cloud systems. The aforementioned procedure makes the setting of the settings of the external device 30 and/or the object 20.1, 20.2 very simple. This is of great significance for the usability of the system, if there are many monitoring and/or control objects. This also simplifies the implementation of the external device 30 and/or the object, particularly in the case of their user-interface means. This also does not demand special properties in the reader device 13.1, 13.2 in order to perform programming of the external device 30 and/or the object 20.1, 20.2, instead the system can be implemented in part of the reader device 13.1, 13.2 as a standard QR code reader, which is found ready in several devices. In the case of QR code for example such a functionality is already built-into, for example, an iPhone device.

In addition to this permitting the connection of the electronic device 40 and/or the external device 30 to a specific monitoring object 20.1, 20.2, it can also be used to change the settings of the external device 30 and/or object 20.1, 20.2, for example during their life cycle. In monitoring applications such a situation can come into question, for example when transferring from one transportation mode to another (truck→aircraft). Then of course, for example, stages 601, 602, and 603 (in part) can be dropped from the procedure, because the monitoring object 20.1, 20.2 has already earlier been linked to the electronic device 40 or an external device 30.

The invention permits the authentication of users 29, for example on the basis of a link defined by a QR code 24 or a similar readable code 12, so that the user 29 cannot be individuated, but it is known, however, that the user 29 in question is, or has been physically present at the monitoring object 20.1, 20.2. The user 29 then reads the QR code 24 or similar code 12 with a reader device 13.1, 13.2. If there is valid encrypted measurement data from a defined period of time, such as, for example, from the last 40 minute, then the user is authenticated and authorized by it.

If complete certainty is desired as to whether the user 29 was precisely at that moment (for example, a 1-minute time window) at the object 20.1, 20.2, when this, for example, sent or sends the object's 20.1, 20.2 measurement data 19' to the server arrangement 11, an additional confirmation can be requested from the user 29. According to one way to implement this, the server arrangement 11 can form web content coded as above, show it on a web page, which in the manner described above in FIG. 6 is shown in stages 606, 607, and then transmit it to the electronic device 40 using the display 32 of the reader device 13.1, 13.2. The web content can be a coded confirmation-id, which the electronic device 40 decodes. Next this confirmation-id is embedded in the QR code's 24 data link in an encrypted form and the user 29 is prompted to read this QR code 24.

When the user 29 reads the QR code 24 again, the reader device 13.1, 13.2 sends the confirmation-id or similar embedded in it to the server arrangement 11 and the server arrangement 11 can thus confirm that the user 29 in question really was, for example, a few seconds ago at the object 20.1, 20.2 and thus also physically present at the electronic device 40. At the same time as the confirmation-id was transmitted to the electronic device 40, other metadata too can be transmitted to it. The use of this embodiment prevents the user 29 from re-opening the link defined by the QR code 24, even through the object 20.1, 20.2 may have already gone on its way. For example, after confirmation of the user 29, he can be sent, for example, context data 33 relating to the object 20.1, 20.2. Thus, the reader device 13.1, 13.2 can also be used to implement authentication, without needing additional properties.

Machine-readable code with a low power consumption, which is particularly suitable, for example, for mass products with a relatively short delivery cycle in the logistics chain, can also be created as follows. According to a first embodiment shown in FIG. 9a, a character display 12' can be used. It is arranged to show main part, for example, of QR code 24 using, for example, one bit. Embedded in the QR code 24 is, in addition, an area 12" of at least one data-pixel, which is arranged to show data to be transmitted (for example, has temperature remained/not remained within set limits). Instead of QR code 24, for example, some 2d code according to standard, such as aztec code or similar, can equally be used to the creation of a static area 12' and the area 12" containing changing data.

According to a second embodiment, which is shown in FIG. 9b, most of the QR code 24 shown on the output device 14 is a preprinted pattern 12'''. In addition, there is in the QR code 24, now in its centre, a data area 12" for data transfer, formed of at least one data-pixel. The preprinted pattern 12''' can show, for example, most of or entirely the server's address 67, or other similar unchanging information. The preprinted pattern 12''' can be read and defined, for example, at the first reading. At the first reading, in addition to the server address 67 or separately, at the second separate reading, read the data-pixels of the QR code 24, which is now in the middle of the data area 12", in which is at least one pixel. Here or also in the previously presented embodiment, the changing data area 12" can be implemented, for example, using an LCD display or similar.

Figure 11:
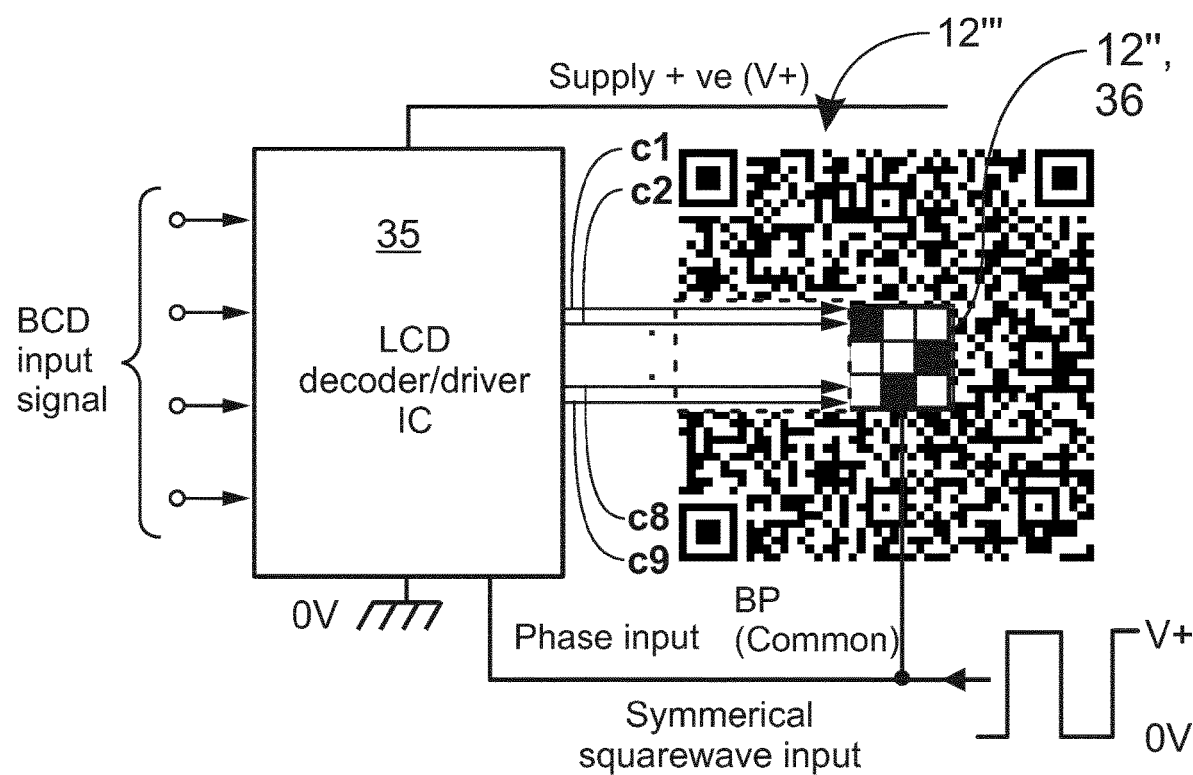
FIG. 11 shows one way to implement, for example, the low-current machine-readable code of FIG. 10a or 10b, and FIGS. 12a and 12b show a simplified schematic diagram of the attaching of the electronic device and external device to each other.

FIG. 11 shows one way to implement the changing data area's 12" otherwise statically implemented QR code 24. The data area 12" is now formed using a small LCD display 36, in which data is arranged, for example, in a 3×3 matrix form. It is controlled by a controller 35, from which there are control lines c1-c9 to the LCD display 36. The controller 35 is in turn controlled using, for example, a CPU 21' (FIG. 2). The number of elements of the pattern shown on the LCD display 36 can be changed as needed. It can be raised to, for example, 16 items or be only 4 items. In the controller 35 there can be one control pin for each element of the pattern 12, 12" and thus the controller 35 is arranged to control each directly through the pins. Thus each pixel can be controlled individually by the controller 35 independently of each other to show the desired information. If, for example, there are 16 segments in the display, then the display can be controlled directly using hexadecimal control. The number of segments can vary. It can be, for example, $2^2$, $2^4$, $2^6$, more generally, $2^x$, in which x=1-8. The monitoring object's state data, which is thus changing data, is shown in the dynamic data area 12" formed by the LCD display 36 and is arranged to be controlled by the controller 35 based on data changing pixel by pixel.

One way to implement data collection relating to this is, for example, when starting measurement to read from the code 12 or store the measurement's reference point, for example, temperature, which is sent to the server for storage. Limit values can be set for the temperature. Then during monitoring only deviations in temperature relative to the reference value are stored and finally it is stated whether the deviations have remained within the set limit values. Another possibility is to store the temperature measurement's angle coefficient based for example on the initial and final reading and/or maximum/minimum value and/or standard deviation.

In the aforementioned embodiments, either the display controller 23 is arranged to form the character display 12' to the QR code 24 or the display is arranged to include, for example, a static pattern 12''' preprinted with ink, both of which can individualize, for example the server's address 67. More generally, the machine-readable code 12 is arranged to belong the static part 12', 12''' formed most of code 12, which is arranged to be formed using the display controller 23 belonging to the electronic device 40 or as a physical data carrier arranged as the printed and changing part 12" arranged particularly for measurement data 19 or similar changing data.

The invention is particularly advantageous in, for example, food-industry applications. Each product package can then be equipped at the factory with an external device 30, which performs measurements on the journey from the factory to the shop and then to the consumer. This very simple and cheap implementation can be used to confirm, for example, to the product's end user, the unbrokenness of the cold chain or the product's origin. Arranging measurement for an individual product will not then substantially affect its price.

In addition to the system 10, the invention also relates to the use of the system 10 and/or electronic device 40 described above to monitor and/or control an object 20.1, 20.2. The object 20.1, 20.2 can be fixed or also moving. One very typical moving object is objects relating to logistics, transported articles or transport units composed of them. The variable being monitored can be any variable at all or something calculated from it, such as, for example, temperature, moisture, pressure, illumination, position, VOC, radon, pH, etc. More particularly, the monitored variable can be such, in which changes can take place. One point-like example of this is refrigerated transportations.

Finally, a few examples of practical applications of the invention are presented.

Consumer Durables/Radiator:

Control/monitoring of a heat radiator implemented using the electronic device 40 and an external device 30 requires such a marginal investment that it can be put even into all products (no longer any need to store separate basic and professional models). The invention permits data collection and also two-way data transmissions and thus the easy transmission of settings to the radiator. The radiator can be configured using a smart device 13.1, 13.2 directly on the manufacturer's website (scan qr→open link→select new settings→display the smart device's 13.1, 13.2 flashing display 32 to the tag 40). The manufacturer can also produce content for customers on its website (marketing, additional sales, recalls, information, manuals).

Industrial Electronics/Frequency Converter:

The settings of frequency converter rarely need to be changed, but parametrizing is complicated when it must be done. The need is not clear (ramps up/down, logical IOs etc.). Settings are many, they are complex and thus errors easily happen. Configuring complicated matters using a simple user interface with a few buttons and a small display is difficult. There is a need for a very comprehensive user interface, which is, however, economical to produce. The invention also permits easy control of frequency converters and similar using a reader device 13.1, 13.2, an electronic device 40, and by an external device 30, in which there are at least data-transmission means 51 and an interface to the frequency converter (unless they are already built in to the frequency converter).

Aviation/Drone/in-Flight Catering:

During flights passengers are served food and drinks, which should be temperature monitored. Radio devices to be taken into an aircraft are extremely tightly regulated. The tight aviation radio regulations can be met using a system implemented by an electronic device 40 and an external device. The low-power electronic device 40 (only a little lithium-small battery) nevertheless brings the benefits of the IoT even during flight, for example, the temperature monitoring of food. The ecosystem can be used during the entire flight. Manufacturers of catering equipment also need not have the system 10 according to the invention approved for aviation use, as it does not produce interfering radio signals.

HVAC—Water Metering/Energy Metering/Building-Services Electronics/Smart Water Meter:

In blocks of flats, for example, water meters are often read by the residents themselves and the readings notified to the water provider (In Finland the house-management company) on paper, by email, or using an electronic system. This, however, leaves the reader an opportunity to notify wrong readings, wittingly or unwittingly. A smart water meter can be compatible with the system 10, measurement can be notified more rapidly, easily, and completely reliably when necessary. In the QR code 24 the water reading is encrypted and time-stamped. By scanning the QR code 24 the data moves to the system 10 and is available in the water provider's interface. At the same time, the water provider can exploit the web view opening to the reader 13.1, 13.2, for example for marketing purposes.

It should be understood that the above description and the related figures are intended only to illustrate the present invention. The invention is thus not restricted only to the embodiments described above or defined in the Claims, instead many different variations and adaptations of the invention, which are possible within the scope of the inventive idea defined in the accompanying claims, will be obvious to one skilled in the art.

The invention claimed is:

1. A data-transmission system for at least one of monitoring and controlling a state of at least one object in the system, comprising:
    at least one external device belonging to or arranged in, respectively, the at least one object for monitoring and/or controlling the state of the at least one object;
    a server arrangement arranged to form and transmit content data containing at least one of coded settings and data for use by at least one of the at least one external device and the at least one object;
    a reader device for reading machine-readable code and having a data receiver for receiving the content data from the server arrangement and a data transmitter to transmit at least one or settings and data; and
    at least one electronic device arrangeable in connection with, respectively, at least one object arrangeable in the system, physically separate from the at least one external device, and comprising:
        a memory arranged to store data received from at least one external device associated with the at least one object;
        a processor coupled to the memory to process the data;
        an output device for displaying machine-readable code containing at least one of the data and data formed from the data received from the at least one external device to be read using the reader device;
        a receiver arranged to receive at least one of the setting and data from the data transmitter of the reader device for controlling at least one of the at least one external device and the at least one object; and
        a data-transmission interface for arranging a two-way data-transmission link between the server arrangement and the at least one external device, wherein the electronic device constitutes a user interface for the at least one external device;
    wherein the two-way data-transmission link is arranged through the at least one external device from the server arrangement to the object and takes place through the reader device and the electronic device.

2. The system according to claim 1, wherein the content data is arranged to be transmitted from the server arrangement to the at least one an external device through the reader device and the electronic device, by which one or more of the following is arranged to be transmitted from the server arrangement to the external device:
- a request to retrieve the data from one of the at least one object and/or one of the at least one external device;
- excitation of one of the at least one object and/or one of the at least one external device;
- synchronization of a clock of one of the at least one object and/or one of the at least one external device;
- setting of settings of one of the at least one object and/or of one of the at least one external device in connection with start-up and/or a changing of the settings of one of the at least one object and/or of one of the at least one external device; and/or
- the data.

3. The system according to claim 2, wherein to perform data transmission to the at least one object and/or the at least one external device,
- the server arrangement is arranged to form web content to be displayed on the reader device, in which the data is coded;
- the reader device is arranged to receive from the server arrangement the web content and display the web content to transmit data to the electronic device;
- the electronic device is arranged to detect the web content and decode from the web content the data; and
- the electronic device is arranged to send the data to the at least one external device.

4. The system according to claim 2, wherein before data transmission from the server arrangement to the at least one external device and/or the at least one object using the server arrangement through the reader device and electronic device, the data to be transmitted is arranged to be defined at least once by the reader device to the server arrangement.

5. The system according to claim 2, wherein
- a request to perform data transmission is arranged to be formed and transmitted in response to the machine-readable code read by the reader device and a transmission made on the basis of the machine-readable code; and
- the server arrangement is arranged to detect a need to perform data transmission on the basis of machine-readable code read by the reader device.

6. The system according to claim 2, wherein
- the reader device comprises more than one reader device and at least some of the reader devices comprise data-formation means; and
- context data relating to the at least one object is arranged as belonging to the two-way data transmission link and to be transmitted from the server arrangement to the reader device, one of the at least one external device and/or one of the at least one object.

7. The system according to claim 1, wherein the data transmitter of the reader device comprises a display of the reader device.

8. The system according to claim 1, wherein to authenticate the presence of a user of the reader device relative to the at least one external device and/or the at least one object,
- the server arrangement is arranged to form the content data, in which an authentication ID is coded, to be shown on the reader device;
- the reader device is arranged to receive the content data from the server arrangement and to present the content data to feed the authentication ID to the electronic device;
- the electronic device is arranged to detect the content data and to decode the authentication ID from the content data;
- the electronic device is arranged to update the machine-readable code on the basis of the authentication ID and to display the machine-readable code on the output device;
- the reader device is arranged to read the machine-readable code and to send the data arranged in the machine-readable code to the server arrangement; and
- the presence of the user relative to the at least one external device and/or the at least one object is arranged to be authenticated by the server arrangement on the basis of the content data.

* * * * *